US012045048B2

(12) United States Patent
Shinde et al.

(10) Patent No.: US 12,045,048 B2
(45) Date of Patent: Jul. 23, 2024

(54) EFFICIENT INTEGRATION OF MACHINE LEARNING MODELS IN BUILDING MANAGEMENT SYSTEMS

(71) Applicant: Johnson Controls Technology Company, Auburn Hills, MI (US)

(72) Inventors: Priti Shinde, Vambori (IN); Deepak Uppal, Delhi (IN)

(73) Assignee: Tyco Fire & Security GmbH

( * ) Notice: Subject to any disclaimer, the term of this patent is extended or adjusted under 35 U.S.C. 154(b) by 0 days.

(21) Appl. No.: 17/218,661

(22) Filed: Mar. 31, 2021

(65) Prior Publication Data

US 2022/0317675 A1  Oct. 6, 2022

(51) Int. Cl.
*G05B 23/02*  (2006.01)
*G06N 20/00*  (2019.01)

(52) U.S. Cl.
CPC ..... *G05B 23/0283* (2013.01); *G05B 23/0216* (2013.01); *G05B 23/024* (2013.01); *G06N 20/00* (2019.01)

(58) Field of Classification Search
CPC ............ G05B 23/0283; G05B 23/0216; G05B 23/024; G06N 20/00
See application file for complete search history.

(56) References Cited

U.S. PATENT DOCUMENTS

| | | | |
|---|---|---|---|
| 2009/0119077 A1* | 5/2009 | Norman | G05B 17/02 703/6 |
| 2011/0071685 A1 | 3/2011 | Huneycutt et al. | |
| 2018/0082185 A1* | 3/2018 | Tanimoto | G06N 5/02 |
| 2019/0123931 A1 | 4/2019 | Schuster et al. | |
| 2020/0363794 A1 | 11/2020 | Schuster et al. | |
| 2020/0370773 A1* | 11/2020 | Li | G05B 13/048 |
| 2021/0191348 A1* | 6/2021 | Lee | G05B 13/048 |
| 2021/0223768 A1* | 7/2021 | Khalate | G06N 7/005 |

FOREIGN PATENT DOCUMENTS

EP  3644581 A1 *  4/2020  ......... H04L 12/2816

* cited by examiner

*Primary Examiner* — Christopher W Carter
(74) *Attorney, Agent, or Firm* — Foley & Lardner LLP

(57) ABSTRACT

A building management system including one or more memory devices and one or more processors, the one or more memory devices configured to store instructions to be executed on the one or more processors, the processors configured to generate a first predictive model using a machine learning technique and an operating data set based on one or more operating parameters associated with at least one of a plurality of BMS subsystems. The processors are further configured to store the first predictive model at a first time interval, to receive a prediction request from a user input at a second time interval following the first time interval, and to retrieve the first predictive model. The one or more processors are further configured execute the retrieved predictive model to generate a first prediction in response to the prediction request; and initiate an automated control response based on the first prediction.

16 Claims, 11 Drawing Sheets

EFFICIENT INTEGRATION OF MACHINE LEARNING MODELS IN BUILDING MANAGEMENT SYSTEMS

BACKGROUND

The present disclosure relates generally to building management systems. The present disclosure relates more particularly to analyzing data sets for building equipment using machine learning and efficient integration of machine learning into building management systems.

To ensure building equipment for a building is operating correctly, data sets related to operation of the building equipment need to be analyzed. The analyses may be performed by human analysts that are qualified to analyze and detect operational problems related with the building equipment from the data sets. However, training the analysts can be expensive and time consuming. Further, with extremely large data sets, manually parsing through the data sets can be difficult if a limited number of analysts are available. Therefore, it is preferable that data sets related to building equipment are analyzed in automated systems, such as machine learning or deep learning systems. However such systems require a substantial amount of time and computing power to analyze data sets and results. It is preferable that machine learning models generate predictions without time or money wasted.

SUMMARY

One implementation of the present disclosure is a building management system ("BMS"), according to some embodiments. The building manage system includes one or more memory devices and one or more processors. The one or more memory devices configured to store instructions to be executed on the one or more processors. The one or more processors are configured to generate a first predictive model using a machine learning technique and an operating data set based on one or more operating parameters associated with at least one of a plurality of BMS subsystems. The one or more processors are further configured to store the first predictive model at a first time interval. The one or more processors are configured to receive a prediction request from a user input at a second time interval following the first time interval, are to retrieve the first predictive model. The one or more processors are further configured execute the retrieved predictive model to generate a first prediction in response to the prediction request; and initiate an automated control response based on the first prediction.

In some embodiments, the operating data set is a first operating data set collected at the first time interval, and the instructions cause one or more processors to automatically train, at the end of an update period, the first predictive model using the first operating data set and a second operating data set collected at a fourth time interval, wherein the fourth time interval is after the first time interval.

In some embodiments, the update period is defined by a user input.

In some embodiments, the first predictive model is generated with the operating data set based on one or more operating parameters associated with at least one of a plurality of BMS subsystems. The BMS subsystems being virtual systems and the operating data set being a simulated data set.

In some embodiments, the instructions cause one or more processors to receive a current data set in response to the prediction request, and generate the first prediction based using the predictive model based on the prediction request and the current data set.

In some embodiments, the operations of the BMS further comprise determining a diagnosis associated with the first prediction to facilitate taking preventative measures and performing an automated control action based on the diagnosis to prevent a predicted fault from occurring.

In some embodiments, the first prediction is a fault prediction for at least one of the plurality of BMS subsystems.

In some embodiments, generating the predictive model comprises transmitting the operating data set based on one or more operating parameters associated with at least one of a plurality of BMS subsystems to a remote computing system and receiving the first predictive model from the remote computing system.

In some embodiments, storing the first predictive model at a first time interval includes transmitting the first predictive model to a remote computing system.

In some embodiments, retrieving the first predictive model includes receiving the first predictive model from a remote computing system.

In some embodiments initiating an automated control response based on the first prediction includes transmitting a notification to a user indicating the first prediction. The notification to the user includes generating and displaying a GUI based on the first prediction, in some embodiments.

In some embodiments initiating an automated control response includes performing an automated control action based on the first prediction to prevent a predicted fault from occurring. The automated control action includes at least one of (i) entering the connected equipment into a safety mode, (ii) operating the connected equipment at a derated state, and (iii) shutting down the connected equipment.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
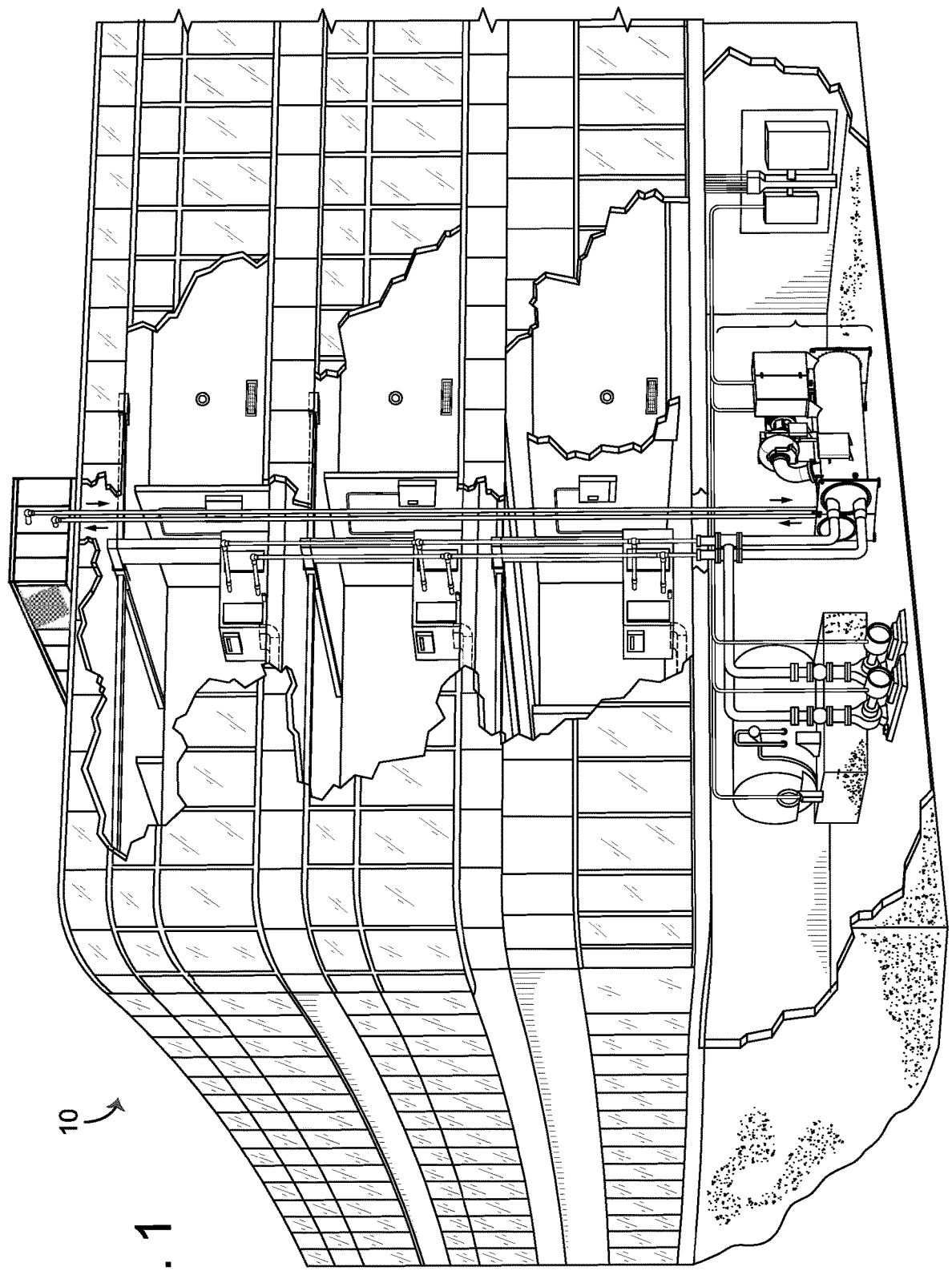
FIG. 1 is a drawing of a building equipped with a building management system (BMS), according to some embodiments.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® building controllers or other devices sold by Johnson Controls, Inc., as well as building devices and components from other sources.

A BMS may include one or more computer systems (e.g., servers, BMS controllers, etc.) that serve as enterprise level controllers, application or data servers, head nodes, master controllers, or field controllers for the BMS. Such computer systems may communicate with multiple downstream building systems or subsystems (e.g., an HVAC system, a security system, etc.) according to like or disparate protocols (e.g., LON, BACnet, etc.). The computer systems may also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices.

Some embodiments of building management systems and methods for relate to automated systems for analyzing data sets related to building equipment that use machine learning or deep learning systems. Some embodiments of the systems and methods are configured to reduce the amount of time and computing power required to analyze data sets and results. In some embodiments, machine learning models generate predictions efficiently with respect to time and cost.

Referring generally to the FIGURES, systems and methods for identifying abnormalities in vibration data sets for building equipment is shown, according to some embodiments. The systems and methods discussed herein can collect data from building equipment and analyze the collected data to determine whether the building equipment may be in a fault state. In particular, the systems and methods described herein can incorporate machine learning (ML) models that can automatically analyze and identify possible abnormalities in the vibration data sets.

The ML model can be used to classify vibration data sets as either "normal" or "abnormal." Normal data sets may indicate associated building equipment is operating as expected and that no faults may be present. However, if the ML model classifies a data set as abnormal, the ML model may have determined that the building equipment has a possibility of being in a fault status. As such, any vibration data sets tagged by the ML model as abnormal can be provided to an analyst for further review. This can ensure that a professional opinion of an individual trained in analyzing vibration data sets can provide feedback regarding whether building equipment associated with abnormal data sets is actually in a fault state.

Using the systems and methods described herein, a workload on analysts can be reduced as some data sets can be automatically flagged as normal. In other words, analysts may not be required to analyze every vibration data set generated by building equipment. These and other features of the systems and methods are described in greater detail below.

Building and Building Management System

Referring now to FIG. 1, a perspective view of a building 10 is shown, according to an exemplary embodiment. A BMS serves building 10. The BMS for building 10 may include any number or type of devices that serve building 10. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.).

BMS devices may collectively or individually be referred to as building equipment. Building equipment may include any number or type of BMS devices within or around building 10. For example, building equipment may include controllers, chillers, rooftop units, fire and security systems, elevator systems, thermostats, lighting, serviceable equipment (e.g., vending machines), and/or any other type of equipment that can be used to control, automate, or otherwise contribute to an environment, state, or condition of building 10. The terms "BMS devices," "BMS device" and "building equipment" are used interchangeably throughout this disclosure.

Figure 2:
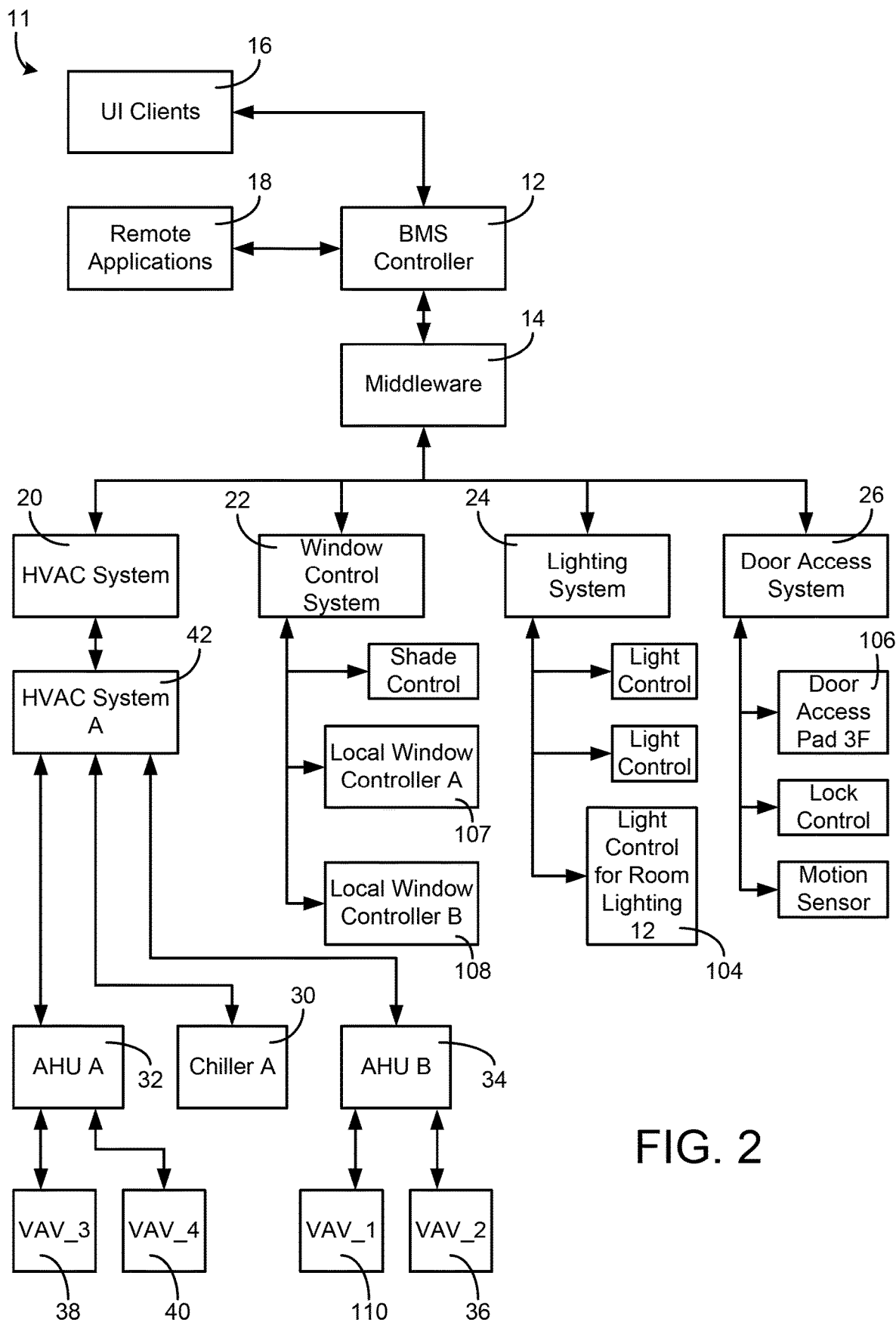
FIG. 2 is a block diagram of a BMS that serves the building of FIG. 1, according to some embodiments.

Referring now to FIG. 2, a block diagram of a BMS 11 for building 10 is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same BMS subsystem 20 (e.g., HVAC system).

As shown in FIG. 2, BMS 11 may include a BMS subsystem 20 (e.g., HVAC system). BMS subsystem 20 (e.g., HVAC system) may control HVAC operations building 10. BMS subsystem 20 (e.g., HVAC system) is shown to include a lower-level HVAC system 42 (named "HVAC system A"). HVAC system 42 may control HVAC operations for a specific floor or zone of building 10. HVAC system 42 may be connected to air handling units (AHUs) 32, 34 (named "AHU A" and "AHU B," respectively, in BMS 11). AHU 32 may serve variable air volume (VAV) boxes 38, 40 (named "VAV_3" and "VAV_4" in BMS 11). Likewise, AHU 34 may serve VAV boxes 36 and 110 (named "VAV_2" and "VAV_1"). HVAC system 42 may also include chiller 30

(named "Chiller A" in BMS 11). Chiller 30 may provide chilled fluid to AHU 32 and/or to AHU 34. HVAC system 42 may receive data (i.e., BMS inputs such as temperature sensor readings, damper positions, temperature setpoints, etc.) from AHUs 32, 34. HVAC system 42 may provide such BMS inputs to BMS subsystem 20 (e.g., HVAC system) and on to middleware 14 and BMS controller 12. Similarly, other BMS subsystems may receive inputs from other building devices or objects and provide the received inputs to BMS controller 12 (e.g., via middleware 14).

Middleware 14 may include services that allow interoperable communication to, from, or between disparate BMS subsystems 20-26 of BMS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, middleware 14 and BMS controller 12 may be integrated in some embodiments. For example, middleware 14 may be a part of BMS controller 12.

Still referring to FIG. 2, window control system 22 may receive shade control information from one or more shade controls, ambient light level information from one or more light sensors, and/or other BMS inputs (e.g., sensor information, setpoint information, current state information, etc.) from downstream devices. Window control system 22 may include window controllers 107, 108 (e.g., named "local window controller A" and "local window controller B," respectively, in BMS 11). Window controllers 107, 108 control the operation of subsets of window control system 22. For example, window controller 108 may control window blind or shade operations for a given room, floor, or building in the BMS.

Lighting system 24 may receive lighting related information from a plurality of downstream light controls (e.g., from room lighting 104). Door access system 26 may receive lock control, motion, state, or other door related information from a plurality of downstream door controls. Door access system 26 is shown to include door access pad 106 (named "Door Access Pad 3F"), which may grant or deny access to a building space (e.g., a floor, a conference room, an office, etc.) based on whether valid user credentials are scanned or entered (e.g., via a keypad, via a badge-scanning pad, etc.).

BMS subsystems 20-26 may be connected to BMS controller 12 via middleware 14 and may be configured to provide BMS controller 12 with BMS inputs from various BMS subsystems 20-26 and their varying downstream devices. BMS controller 12 may be configured to make differences in building subsystems transparent at the human-machine interface or client interface level (e.g., for connected or hosted user interface (UI) clients 16, remote applications 18, etc.). BMS controller 12 may be configured to describe or model different building devices and building subsystems using common or unified objects (e.g., software objects stored in memory) to help provide the transparency. Software equipment objects may allow developers to write applications capable of monitoring and/or controlling various types of building equipment regardless of equipment-specific variations (e.g., equipment model, equipment manufacturer, equipment version, etc.). Software building objects may allow developers to write applications capable of monitoring and/or controlling building zones on a zone-by-zone level regardless of the building subsystem makeup.

Figure 3:
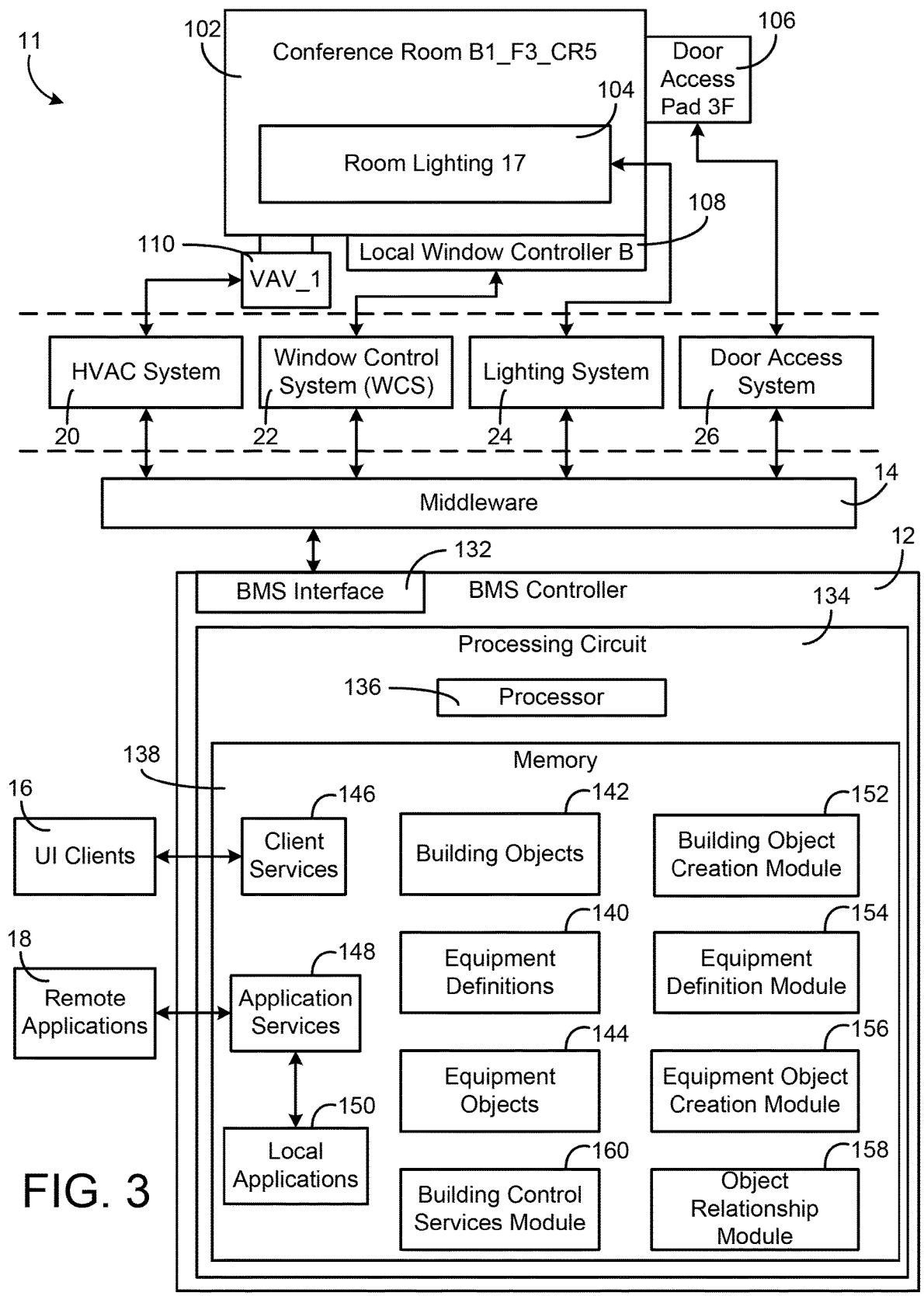
FIG. 3 is a block diagram of a BMS controller which can be used in the BMS of FIG. 2, according to some embodiments.

Referring now to FIG. 3, a block diagram illustrating a portion of BMS 11 in greater detail is shown, according to an exemplary embodiment. Particularly, FIG. 3 illustrates a portion of BMS 11 that services a conference room 102 of building 10 (named "B1_F3_CR5"). Conference room 102 may be affected by many different building devices connected to many different BMS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 3 may include local control circuitry configured to provide signals to their supervisory controllers or more generally to the BMS subsystems 20-26. The local control circuitry of the building devices shown at the top of FIG. 3 may also be configured to receive and respond to control signals, commands, setpoints, or other data from their supervisory controllers. For example, the local control circuitry of VAV box 110 may include circuitry that affects an actuator in response to control signals received from a field controller that is a part of BMS subsystem 20 (e.g., HVAC system). Window controller 108 may include circuitry that affects windows or blinds in response to control signals received from a field controller that is part of window control system (WCS) 22. Room lighting 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

Still referring to FIG. 3, BMS controller 12 is shown to include a BMS interface 132 in communication with middleware 14. In some embodiments, BMS interface 132 is a communications interface. For example, BMS interface 132 may include wired or wireless interfaces (e.g., jacks, antennas, transmitters, receivers, transceivers, wire terminals, etc.) for conducting data communications with various systems, devices, or networks. BMS interface 132 can include an Ethernet card and port for sending and receiving data via an Ethernet-based communications network. In another example, BMS interface 132 includes a Wi-Fi transceiver for communicating via a wireless communications network. BMS interface 132 may be configured to communicate via local area networks or wide area networks (e.g., the Internet, a building WAN, etc.).

In some embodiments, BMS interface 132 and/or middleware 14 includes an application gateway configured to receive input from applications running on client devices. For example, BMS interface 132 and/or middleware 14 may include one or more wireless transceivers (e.g., a Wi-Fi transceiver, a Bluetooth transceiver, a NFC transceiver, a cellular transceiver, etc.) for communicating with client devices. BMS interface 132 may be configured to receive building management inputs from middleware 14 or directly from one or more BMS subsystems 20-26. BMS interface 132 and/or middleware 14 can include any number of software buffers, queues, listeners, filters, translators, or other communications-supporting services.

Still referring to FIG. 3, BMS controller 12 is shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

Memory 138 may include one or more devices (e.g., memory units, memory devices, storage devices, etc.) for storing data and/or computer code for completing and/or facilitating the various processes described in the present disclosure. Memory 138 may include random access memory (RAM), read-only memory (ROM), hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138 may be communicably connected to processor 136 via processing circuit 134 and may include computer code for executing (e.g., by processor 136) one or more processes described herein. When processor 136 executes instructions stored in memory 138 for completing the various activities described herein, processor 136 generally configures BMS controller 12 (and more particularly processing circuit 134) to complete such activities.

Still referring to FIG. 3, memory 138 is shown to include building objects 142. In some embodiments, BMS controller 12 uses building objects 142 to group otherwise ungrouped or unassociated devices so that the group may be addressed or handled by applications together and in a consistent manner (e.g., a single user interface for controlling all of the BMS devices that affect a particular building zone or room). Building objects can apply to spaces of any granularity. For example, a building object can represent an entire building, a floor of a building, or individual rooms on each floor. In some embodiments, BMS controller 12 creates and/or stores a building object in memory 138 for each zone or room of building 10. Building objects 142 can be accessed by UI clients 16 and remote applications 18 to provide a comprehensive user interface for controlling and/or viewing information for a particular building zone. Building objects 142 may be created by building object creation module 152 and associated with equipment objects by object relationship module 158, described in greater detail below.

Still referring to FIG. 3, memory 138 is shown to include equipment definitions 140. Equipment definitions 140 stores the equipment definitions for various types of building equipment. Each equipment definition may apply to building equipment of a different type. For example, equipment definitions 140 may include different equipment definitions for variable air volume modular assemblies (VMAs), fan coil units, air handling units (AHUs), lighting fixtures, water pumps, and/or other types of building equipment.

Equipment definitions 140 define the types of data points that are generally associated with various types of building equipment. For example, an equipment definition for VMA may specify data point types such as room temperature, damper position, supply air flow, and/or other types data measured or used by the VMA. Equipment definitions 140 allow for the abstraction (e.g., generalization, normalization, broadening, etc.) of equipment data from a specific BMS device so that the equipment data can be applied to a room or space.

Each of equipment definitions 140 may include one or more point definitions. Each point definition may define a data point of a particular type and may include search criteria for automatically discovering and/or identifying data points that satisfy the point definition. An equipment definition can be applied to multiple pieces of building equipment of the same general type (e.g., multiple different VMA controllers). When an equipment definition is applied to a BMS device, the search criteria specified by the point definitions can be used to automatically identify data points provided by the BMS device that satisfy each point definition.

In some embodiments, equipment definitions 140 define data point types as generalized types of data without regard to the model, manufacturer, vendor, or other differences between building equipment of the same general type. The generalized data points defined by equipment definitions 140 allows each equipment definition to be referenced by or applied to multiple different variants of the same type of building equipment.

In some embodiments, equipment definitions 140 facilitate the presentation of data points in a consistent and user-friendly manner. For example, each equipment definition may define one or more data points that are displayed via a user interface. The displayed data points may be a subset of the data points defined by the equipment definition.

In some embodiments, equipment definitions 140 specify a system type (e.g., HVAC, lighting, security, fire, etc.), a system sub-type (e.g., terminal units, air handlers, central plants), and/or data category (e.g., critical, diagnostic, operational) associated with the building equipment defined by each equipment definition. Specifying such attributes of building equipment at the equipment definition level allows the attributes to be applied to the building equipment along with the equipment definition when the building equipment is initially defined. Building equipment can be filtered by various attributes provided in the equipment definition to facilitate the reporting and management of equipment data from multiple building systems.

Equipment definitions 140 can be automatically created by abstracting the data points provided by archetypal controllers (e.g., typical or representative controllers) for various types of building equipment. In some embodiments, equipment definitions 140 are created by equipment definition module 154, described in greater detail below.

Still referring to FIG. 3, memory 138 is shown to include equipment objects 144. Equipment objects 144 may be software objects that define a mapping between a data point type (e.g., supply air temperature, room temperature, damper position) and an actual data point (e.g., a measured or calculated value for the corresponding data point type) for various pieces of building equipment. Equipment objects 144 may facilitate the presentation of equipment-specific data points in an intuitive and user-friendly manner by associating each data point with an attribute identifying the corresponding data point type. The mapping provided by equipment objects 144 may be used to associate a particular data value measured or calculated by BMS 11 with an attribute that can be displayed via a user interface.

Equipment objects 144 can be created (e.g., by equipment object creation module 156) by referencing equipment definitions 140. For example, an equipment object can be created by applying an equipment definition to the data points provided by a BMS device. The search criteria included in an equipment definition can be used to identify data points of the building equipment that satisfy the point definitions. A data point that satisfies a point definition can be mapped to an attribute of the equipment object corresponding to the point definition.

Each equipment object may include one or more attributes defined by the point definitions of the equipment definition used to create the equipment object. For example, an equipment definition which defines the attributes "Occupied Command," "Room Temperature," and "Damper Position" may result in an equipment object being created with the same attributes. The search criteria provided by the equipment definition are used to identify and map data points associated with a particular BMS device to the attributes of the equipment object. The creation of equipment objects is described in greater detail below with reference to equipment object creation module 156.

Equipment objects 144 may be related with each other and/or with building objects 142. Causal relationships can be established between equipment objects to link equipment objects to each other. For example, a causal relationship can be established between a VMA and an AHU which provides airflow to the VMA. Causal relationships can also be established between equipment objects 144 and building objects 142. For example, equipment objects 144 can be associated with building objects 142 representing particular rooms or zones to indicate that the equipment object serves that room or zone. Relationships between objects are described in greater detail below with reference to object relationship module 158.

Still referring to FIG. 3, memory 138 is shown to include client services 146 and application services 148. Client services 146 may be configured to facilitate interaction and/or communication between BMS controller 12 and various internal or external clients or applications. For example, client services 146 may include web services or application programming interfaces available for communication by UI clients 16 and remote applications 18 (e.g., applications running on a mobile device, energy monitoring applications, applications allowing a user to monitor the performance of the BMS, automated fault detection and diagnostics systems, etc.). Application services 148 may facilitate direct or indirect communications between remote applications 18, local applications 150, and BMS controller 12. For example, application services 148 may allow BMS controller 12 to communicate (e.g., over a communications network) with remote applications 18 running on mobile devices and/or with other BMS controllers.

In some embodiments, application services 148 facilitate an applications gateway for conducting electronic data communications with UI clients 16 and/or remote applications 18. For example, application services 148 may be configured to receive communications from mobile devices and/or BMS devices. Client services 146 may provide client devices with a graphical user interface that consumes data points and/or display data defined by equipment definitions 140 and mapped by equipment objects 144.

Still referring to FIG. 3, memory 138 is shown to include a building object creation module 152. Building object creation module 152 may be configured to create the building objects stored in building objects 142. Building object creation module 152 may create a software building object for various spaces within building 10. Building object creation module 152 can create a building object for a space of any size or granularity. For example, building object creation module 152 can create a building object representing an entire building, a floor of a building, or individual rooms on each floor. In some embodiments, building object creation module 152 creates and/or stores a building object in memory 138 for each zone or room of building 10.

The building objects created by building object creation module 152 can be accessed by UI clients 16 and remote applications 18 to provide a comprehensive user interface for controlling and/or viewing information for a particular building zone. Building objects 142 can group otherwise ungrouped or unassociated devices so that the group may be addressed or handled by applications together and in a consistent manner (e.g., a single user interface for controlling all of the BMS devices that affect a particular building zone or room). In some embodiments, building object creation module 152 uses the systems and methods described in U.S. patent application Ser. No. 12/887,390, filed Sep. 21, 2010, for creating software defined building objects.

In some embodiments, building object creation module 152 provides a user interface for guiding a user through a process of creating building objects. For example, building object creation module 152 may provide a user interface to client devices (e.g., via client services 146) that allows a new space to be defined. In some embodiments, building object creation module 152 defines spaces hierarchically. For example, the user interface for creating building objects may prompt a user to create a space for a building, for floors within the building, and/or for rooms or zones within each floor.

In some embodiments, building object creation module 152 creates building objects automatically or semi-automatically. For example, building object creation module 152 may automatically define and create building objects using data imported from another data source (e.g., user view folders, a table, a spreadsheet, etc.). In some embodiments, building object creation module 152 references an existing hierarchy for BMS 11 to define the spaces within building 10. For example, BMS 11 may provide a listing of controllers for building 10 (e.g., as part of a network of data points) that have the physical location (e.g., room name) of the controller in the name of the controller itself. Building object creation module 152 may extract room names from the names of BMS controllers defined in the network of data points and create building objects for each extracted room. Building objects may be stored in building objects 142.

Still referring to FIG. 3, memory 138 is shown to include an equipment definition module 154. Equipment definition module 154 may be configured to create equipment definitions for various types of building equipment and to store the equipment definitions in equipment definitions 140. In some embodiments, equipment definition module 154 creates equipment definitions by abstracting the data points provided by archetypal controllers (e.g., typical or representative controllers) for various types of building equipment. For example, equipment definition module 154 may receive a user selection of an archetypal controller via a user interface. The archetypal controller may be specified as a user input or selected automatically by equipment definition module 154. In some embodiments, equipment definition module 154 selects an archetypal controller for building equipment associated with a terminal unit such as a VMA.

Equipment definition module 154 may identify one or more data points associated with the archetypal controller. Identifying one or more data points associated with the archetypal controller may include accessing a network of data points provided by BMS 11. The network of data points may be a hierarchical representation of data points that are measured, calculated, or otherwise obtained by various BMS devices. BMS devices may be represented in the network of data points as nodes of the hierarchical representation with associated data points depending from each BMS device. Equipment definition module 154 may find the node corresponding to the archetypal controller in the network of data points and identify one or more data points which depend from the archetypal controller node.

Equipment definition module 154 may generate a point definition for each identified data point of the archetypal controller. Each point definition may include an abstraction of the corresponding data point that is applicable to multiple different controllers for the same type of building equipment. For example, an archetypal controller for a particular VMA (i.e., "VMA-20") may be associated an equipment-specific data point such as "VMA-20.DPR-POS" (i.e., the damper position of VMA-20) and/or "VMA-20.SUP-FLOW" (i.e., the supply air flow rate through VMA-20). Equipment definition module 154 abstract the equipment-specific data points to generate abstracted data point types that are generally applicable to other equipment of the same type. For example, equipment definition module 154 may abstract the equipment-specific data point "VMA-20.DPR-POS" to generate the abstracted data point type "DPR-POS" and may abstract the equipment-specific data point "VMA-20.SUP-FLOW" to generate the abstracted data point type "SUP-FLOW." Advantageously, the abstracted data point types generated by equipment definition module 154 can be applied to multiple different variants of the same type of building equipment (e.g., VMAs from different manufacturers, VMAs having different models or output data formats, etc.).

In some embodiments, equipment definition module 154 generates a user-friendly label for each point definition. The user-friendly label may be a plain text description of the variable defined by the point definition. For example, equipment definition module 154 may generate the label "Supply Air Flow" for the point definition corresponding to the abstracted data point type "SUP-FLOW" to indicate that the data point represents a supply air flow rate through the VMA. The labels generated by equipment definition module 154 may be displayed in conjunction with data values from BMS devices as part of a user-friendly interface.

In some embodiments, equipment definition module 154 generates search criteria for each point definition. The search criteria may include one or more parameters for identifying another data point (e.g., a data point associated with another controller of BMS 11 for the same type of building equipment) that represents the same variable as the point definition. Search criteria may include, for example, an instance number of the data point, a network address of the data point, and/or a network point type of the data point.

In some embodiments, search criteria include a text string abstracted from a data point associated with the archetypal controller. For example, equipment definition module 154 may generate the abstracted text string "SUP-FLOW" from the equipment-specific data point "VMA-20.SUP-FLOW." Advantageously, the abstracted text string matches other equipment-specific data points corresponding to the supply air flow rates of other BMS devices (e.g., "VMA-18.SUP-FLOW," "SUP-FLOW.VMA-01," etc.). Equipment definition module 154 may store a name, label, and/or search criteria for each point definition in memory 138.

Equipment definition module 154 may use the generated point definitions to create an equipment definition for a particular type of building equipment (e.g., the same type of building equipment associated with the archetypal controller). The equipment definition may include one or more of the generated point definitions. Each point definition defines a potential attribute of BMS devices of the particular type and provides search criteria for identifying the attribute among other data points provided by such BMS devices.

In some embodiments, the equipment definition created by equipment definition module 154 includes an indication of display data for BMS devices that reference the equipment definition. Display data may define one or more data points of the BMS device that will be displayed via a user interface. In some embodiments, display data are user defined. For example, equipment definition module 154 may prompt a user to select one or more of the point definitions included in the equipment definition to be represented in the display data. Display data may include the user-friendly label (e.g., "Damper Position") and/or short name (e.g., "DPR-POS") associated with the selected point definitions.

In some embodiments, equipment definition module 154 provides a visualization of the equipment definition via a graphical user interface. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition can be used to add, remove, or change point definitions and/or display data associated with the equipment definitions.

Equipment definition module 154 may generate an equipment definition for each different type of building equipment in BMS 11 (e.g., VMAs, chillers, AHUs, etc.). Equipment definition module 154 may store the equipment definitions in a data storage device (e.g., memory 138, equipment definitions 140, an external or remote data storage device, etc.).

Still referring to FIG. 3, memory 138 is shown to include an equipment object creation module 156. Equipment object creation module 156 may be configured to create equipment objects for various BMS devices. In some embodiments, equipment object creation module 156 creates an equipment object by applying an equipment definition to the data points provided by a BMS device. For example, equipment object creation module 156 may receive an equipment definition created by equipment definition module 154. Receiving an equipment definition may include loading or retrieving the equipment definition from a data storage device.

In some embodiments, equipment object creation module 156 determines which of a plurality of equipment definitions to retrieve based on the type of BMS device used to create the equipment object. For example, if the BMS device is a VMA, equipment object creation module 156 may retrieve the equipment definition for VMAs; whereas if the BMS device is a chiller, equipment object creation module 156 may retrieve the equipment definition for chillers. The type of BMS device to which an equipment definition applies may be stored as an attribute of the equipment definition. Equipment object creation module 156 may identify the type of BMS device being used to create the equipment object and retrieve the corresponding equipment definition from the data storage device.

In other embodiments, equipment object creation module 156 receives an equipment definition prior to selecting a BMS device. Equipment object creation module 156 may identify a BMS device of BMS 11 to which the equipment definition applies. For example, equipment object creation module 156 may identify a BMS device that is of the same type of building equipment as the archetypal BMS device used to generate the equipment definition. In various embodiments, the BMS device used to generate the equipment object may be selected automatically (e.g., by equipment object creation module 156), manually (e.g., by a user) or semi-automatically (e.g., by a user in response to an automated prompt from equipment object creation module 156).

In some embodiments, equipment object creation module 156 creates an equipment discovery table based on the equipment definition. For example, equipment object creation module 156 may create an equipment discovery table having attributes (e.g., columns) corresponding to the variables defined by the equipment definition (e.g., a damper position attribute, a supply air flow rate attribute, etc.). Each column of the equipment discovery table may correspond to a point definition of the equipment definition. The equipment discovery table may have columns that are categorically defined (e.g., representing defined variables) but not yet mapped to any particular data points.

Equipment object creation module 156 may use the equipment definition to automatically identify one or more data points of the selected BMS device to map to the columns of the equipment discovery table. Equipment object creation module 156 may search for data points of the BMS device that satisfy one or more of the point definitions included in the equipment definition. In some embodiments, equipment object creation module 156 extracts a search criterion from each point definition of the equipment definition. Equipment object creation module 156 may access a data point network of the building automation system to identify one or more data points associated with the selected BMS device. Equipment object creation module 156 may use the extracted search criterion to determine which of the identified data points satisfy one or more of the point definitions.

In some embodiments, equipment object creation module 156 automatically maps (e.g., links, associates, relates, etc.) the identified data points of selected BMS device to the equipment discovery table. A data point of the selected BMS device may be mapped to a column of the equipment discovery table in response to a determination by equipment object creation module 156 that the data point satisfies the point definition (e.g., the search criteria) used to generate the column. For example, if a data point of the selected BMS device has the name "VMA-18. SUP-FLOW" and a search criterion is the text string "SUP-FLOW," equipment object creation module 156 may determine that the search criterion is met. Accordingly, equipment object creation module 156 may map the data point of the selected BMS device to the corresponding column of the equipment discovery table.

Advantageously, equipment object creation module 156 may create multiple equipment objects and map data points to attributes of the created equipment objects in an automated fashion (e.g., without human intervention, with minimal human intervention, etc.). The search criteria provided by the equipment definition facilitates the automatic discovery and identification of data points for a plurality of equipment object attributes. Equipment object creation module 156 may label each attribute of the created equipment objects with a device-independent label derived from the equipment definition used to create the equipment object. The equipment objects created by equipment object creation module 156 can be viewed (e.g., via a user interface) and/or interpreted by data consumers in a consistent and intuitive manner regardless of device-specific differences between BMS devices of the same general type. The equipment objects created by equipment object creation module 156 may be stored in equipment objects 144.

Still referring to FIG. 3, memory 138 is shown to include an object relationship module 158. Object relationship module 158 may be configured to establish relationships between equipment objects 144. In some embodiments, object relationship module 158 establishes causal relationships between equipment objects 144 based on the ability of one BMS device to affect another BMS device. For example, object relationship module 158 may establish a causal relationship between a terminal unit (e.g., a VMA) and an upstream unit (e.g., an AHU, a chiller, etc.) which affects an input provided to the terminal unit (e.g., air flow rate, air temperature, etc.).

Object relationship module 158 may establish relationships between equipment objects 144 and building objects 142 (e.g., spaces). For example, object relationship module 158 may associate equipment objects 144 with building objects 142 representing particular rooms or zones to indicate that the equipment object serves that room or zone. In some embodiments, object relationship module 158 provides a user interface through which a user can define relationships between equipment objects 144 and building objects 142. For example, a user can assign relationships in a "drag and drop" fashion by dragging and dropping a building object and/or an equipment object into a "serving" cell of an equipment object provided via the user interface to indicate that the BMS device represented by the equipment object serves a particular space or BMS device.

Still referring to FIG. 3, memory 138 is shown to include a building control services module 160. Building control services module 160 may be configured to automatically control BMS 11 and the various subsystems thereof. Building control services module 160 may utilize closed loop control, feedback control, PI control, model predictive control, or any other type of automated building control methodology to control the environment (e.g., a variable state or condition) within building 10.

Building control services module 160 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BMS interface 132. Building control services module 160 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 160 is configured to control the environment of building 10 on a zone-individualized level. For example, building control services module 160 may control the environment of two or more different building zones using different setpoints, different constraints, different control methodology, and/or different control parameters. Building control services module 160 may operate BMS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 160 uses the location of various BMS devices to translate an input received from a building system into an output or control signal for the building system. Building control services module 160 may receive location information for BMS devices and automatically set or recommend control parameters for the BMS devices based on the locations of the BMS devices. For example, building control services module 160 may automatically set a flow rate setpoint for a VAV box based on the size of the building zone in which the VAV box is located.

Building control services module 160 may determine which of a plurality of sensors to use in conjunction with a feedback control loop based on the locations of the sensors within building 10. For example, building control services module 160 may use a signal from a temperature sensor located in a building zone as a feedback signal for controlling the temperature of the building zone in which the temperature sensor is located.

In some embodiments, building control services module 160 automatically generates control algorithms for a controller or a building zone based on the location of the zone in the building 10. For example, building control services module 160 may be configured to predict a change in demand resulting from sunlight entering through windows based on the orientation of the building and the locations of the building zones (e.g., east-facing, west-facing, perimeter zones, interior zones, etc.).

Building control services module 160 may use zone location information and interactions between adjacent building zones (rather than considering each zone as an isolated system) to more efficiently control the temperature and/or airflow within building 10. For control loops that are conducted at a larger scale (i.e., floor level) building control services module 160 may use the location of each building zone and/or BMS device to coordinate control functionality between building zones. For example, building control services module 160 may consider heat exchange and/or air exchange between adjacent building zones as a factor in determining an output control signal for the building zones.

In some embodiments, building control services module 160 is configured to optimize the energy efficiency of building 10 using the locations of various BMS devices and the control parameters associated therewith. Building control services module 160 may be configured to achieve control setpoints using building equipment with a relatively lower energy cost (e.g., by causing airflow between connected building zones) in order to reduce the loading on building equipment with a relatively higher energy cost (e.g., chillers and roof top units). For example, building control services module 160 may be configured to move warmer air from higher elevation zones to lower elevation zones by establishing pressure gradients between connected building zones.

Figure 4:
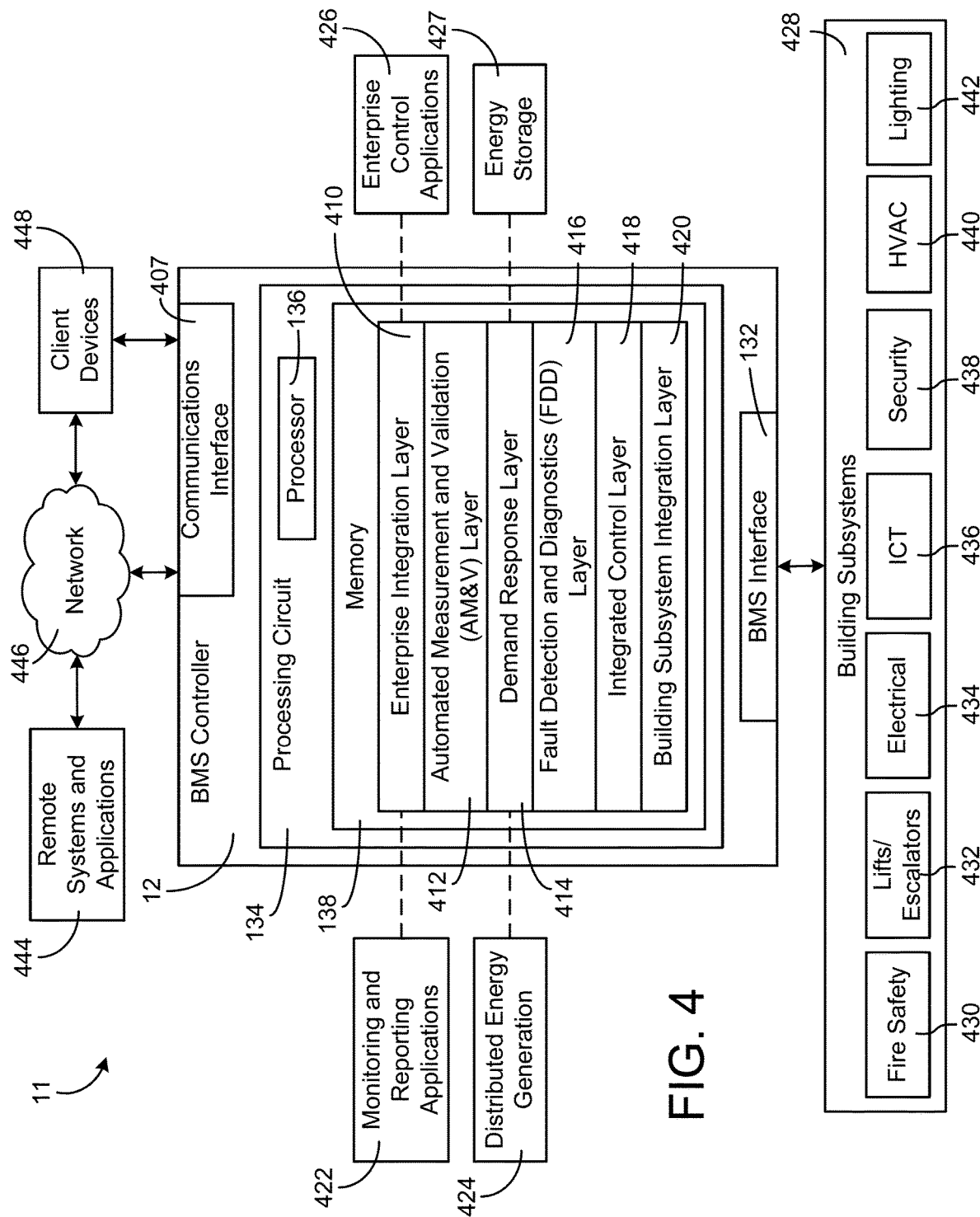
FIG. 4 is another block diagram of the BMS that serves the building of FIG. 1, according to some embodiments.

Referring now to FIG. 4, another block diagram illustrating a portion of BMS 11 in greater detail is shown, according to some embodiments. BMS 11 can be implemented in building 10 to automatically monitor and control various building functions. BMS 11 is shown to include BMS controller 12 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 428 can include any number of devices, controllers, and connections for completing its individual functions and control activities. HVAC subsystem 440 can include many of the same components as BMS subsystem 20 (e.g., HVAC system), as described with reference to FIGS. 2-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 12 is shown to include a communications interface 407 and a BMS interface 132. Interface 407 may facilitate communications between BMS controller 12 and external applications (e.g., monitoring and reporting applications 422, enterprise control applications 426, remote systems and applications 444, applications residing on client devices 448, etc.) for allowing user control, monitoring, and adjustment to BMS controller 12 and/or subsystems 428. Interface 407 may also facilitate communications between BMS controller 12 and client devices 448. BMS interface 132 may facilitate communications between BMS controller 12 and building subsystems 428 (e.g., HVAC, lighting security, lifts, power distribution, business, etc.).

Interfaces 407, 132 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 132 can be direct (e.g., local wired or wireless communications) or via a communications network 446 (e.g., a WAN, the Internet, a cellular network, etc.). For example, interfaces 407, 132 can include an Ethernet card and port for sending and receiving data via an Ethernet-based communications link or network. In another example, interfaces 407, 132 can include a Wi-Fi transceiver for communicating via a wireless communications network. In another example, one or both of interfaces 407, 132 can include cellular or mobile phone communications transceivers. In one embodiment, communications interface 407 is a power line communications interface and BMS interface 132 is an Ethernet interface. In other embodiments, both communications interface 407 and BMS interface 132 are Ethernet interfaces or are the same Ethernet interface.

Still referring to FIG. 4, BMS controller 12 is shown to include a processing circuit 134 including a processor 136 and memory 138. Processing circuit 134 can be communicably connected to BMS interface 132 and/or communications interface 407 such that processing circuit 134 and the various components thereof can send and receive data via interfaces 407, 132. Processor 136 can be implemented as a general purpose processor, an application specific integrated circuit (ASIC), one or more field programmable gate arrays (FPGAs), a group of processing components, or other suitable electronic processing components.

Memory 138 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 138 can be or include volatile memory or non-volatile memory. Memory 138 can include database components, object code components, script components, or any other type of information structure for supporting the various activities and information structures described in the present application. According to some embodiments, memory 138 is communicably connected to processor 136 via processing circuit 134 and includes computer code for executing (e.g., by processing circuit 134 and/or processor 136) one or more processes described herein.

In some embodiments, BMS controller 12 is implemented within a single computer (e.g., one server, one housing, etc.). In various other embodiments BMS controller 12 can be distributed across multiple servers or computers (e.g., that can exist in distributed locations). Further, while FIG. 4 shows applications 422 and 426 as existing outside of BMS controller 12, in some embodiments, applications 422 and 426 can be hosted within BMS controller 12 (e.g., within memory 138).

Still referring to FIG. 4, memory 138 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 11.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 12. In yet other embodiments, enterprise control applications 426 can work with layers 410-420 to optimize building performance (e.g., efficiency, energy use, comfort, or safety) based on inputs received at interface 407 and/or BMS interface 132.

Building subsystem integration layer 420 can be configured to manage communications between BMS controller 12 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427, or from other sources. Demand response layer 414 may receive inputs from other layers of BMS controller 12 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem.

Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 11 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Fault Detection and Building Management Systems

Referring generally to FIGS. 5-11 systems and methods for analyzing data sets and identifying faulty building equipment using machine learning are shown, according to some embodiments. The systems and methods described herein may relate to analyzing various vibration data sets for building equipment that can provide an overall indication of whether specific building devices are functioning properly. It should be appreciated that similar methodologies described herein can be applied to data sets other than vibration data sets, such as temperature, pressure, humidity data sets as well as equipment data sets such as equipment on/off states, equipment operating capacities, and/or any other information that can be used by a building management system controller to monitor and control BMS devices. Further, it should be appreciated that analyzing vibration data sets for building equipment as described herein is provided for sake of example. Analyzation of vibration data sets as described herein can be applied to any sort of equipment and is not intended to be limited to building equipment. For example, vibration data sets can be gathered and analyzed for equipment such as photolithography equipment, microelectronics manufacturing equipment or other manufacturing equipment, etc. In this way, vibration data sets can be analyzed to detect faults and/or other problems in various types of equipment.

Vibration analysis is an important tool in identifying mechanical issues in building equipment such as chillers, fans, pumps, etc. In some embodiments, vibrational data is collected on-site by mounting sensors on building equipment. For example, sensors may be placed on a casing of a machine at bearing locations across a machine drive line. Vibrational sensors may be placed at bearings as bearings may be a primary point where forces are transferred from internal components to an external casing. Sensors may be placed across multiple bearing points (e.g., 3 points, 4 points, 10 points, etc.) on a building device and can monitor/gather vibrational data across 3-dimensional spatial coordinates (i.e., X axis, Y axis, and Z axis). The vibrational data can be assessed to identify potential issues so they can be corrected before serious damage to the building equipment occurs. While rules derived from years of domain knowledge may automate a portion of the analysis, the rules are incomplete and cannot confidently rule out a possibility of building faults, and therefore human inspection of all datasets may be required in traditional systems.

Due to modern advances in building equipment, most building equipment is highly reliable and experiences faults relatively infrequently. As such, a large amount of data sets associated with building equipment may indicate the building equipment is operating as normal. Requiring analysts to manually parse through data sets that have no suspicion of indicating faults can be time-consuming and wasteful for the analysts and a company hiring the analysts. As such, a machine learning model can be utilized to qualify data sets into categories indicating whether the data sets appear to indicate normal operation or appear to indicate an issue with building equipment that should be addressed in further detail.

As a size of collected data sets increases, human analysis of each data set may become more and more unviable. As such, a machine learning (ML) model can be utilized to reduce an amount of data sets required for human analysis. By automating at least part of the analysis process, a burden on analysts can be reduced and money can be saved for a company (e.g., by requiring fewer analysts) among other benefits.

When analyzing data sets for building equipment, it may be important for the ML model to generate reports (i.e., results of automated analyses) that do not let any data set be flagged as "normal" (i.e., no issue is present) when the data set is actually "abnormal" (i.e., a problem with the building equipment is present). In other words, anomaly detection performed by the ML model may be configured such that any data sets that have even a slight change of being abnormal may be flagged for further analysis by an analyst. In this way, a number of false negatives can be reduced/eliminated to ensure that no critical faults are missed by the ML model and are accidentally flagged as normal.

Figure 5:
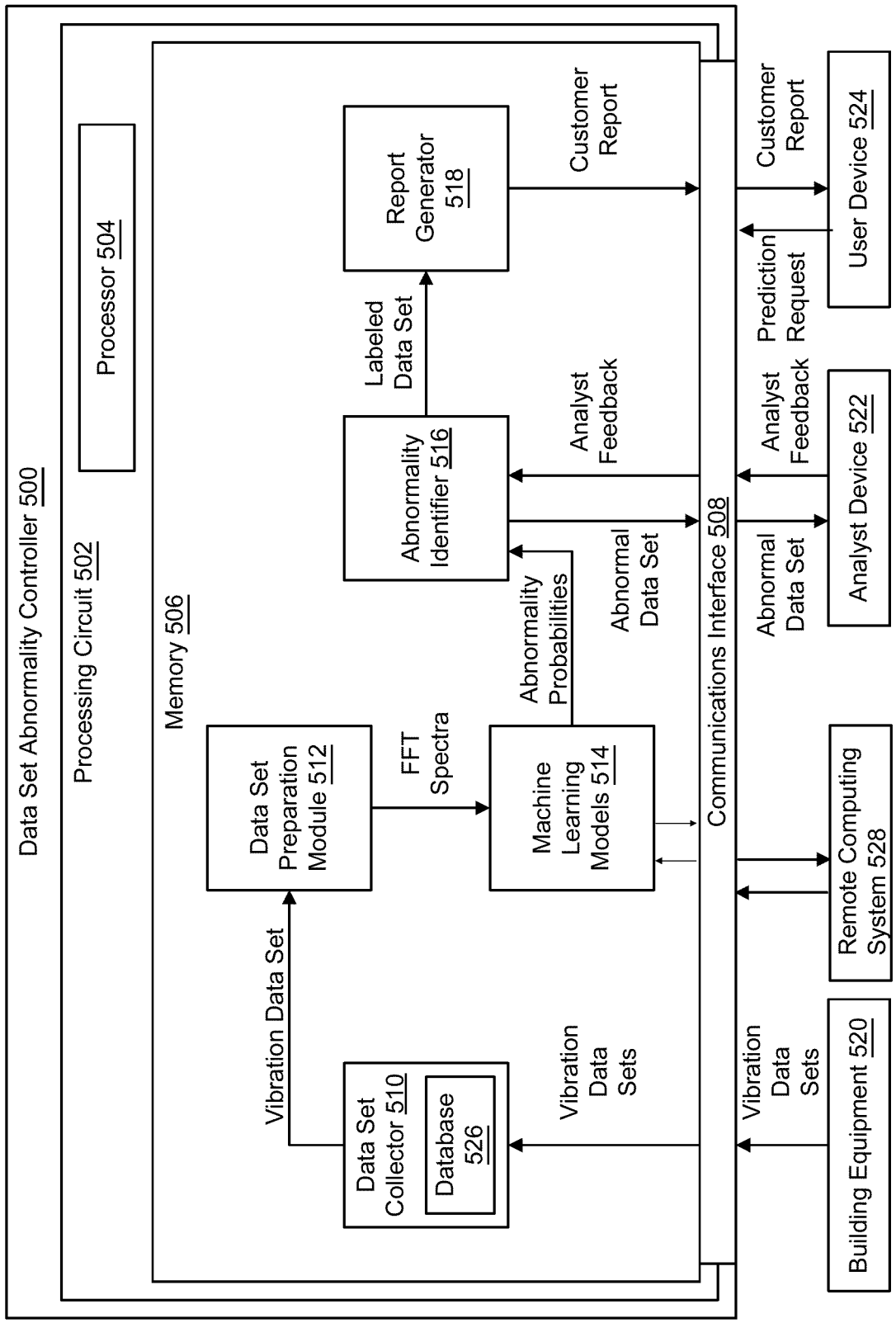
FIG. 5 is a block diagram of another BMS which can be used to monitor and control the building of FIG. 1, according to some embodiments.
Figure 6:
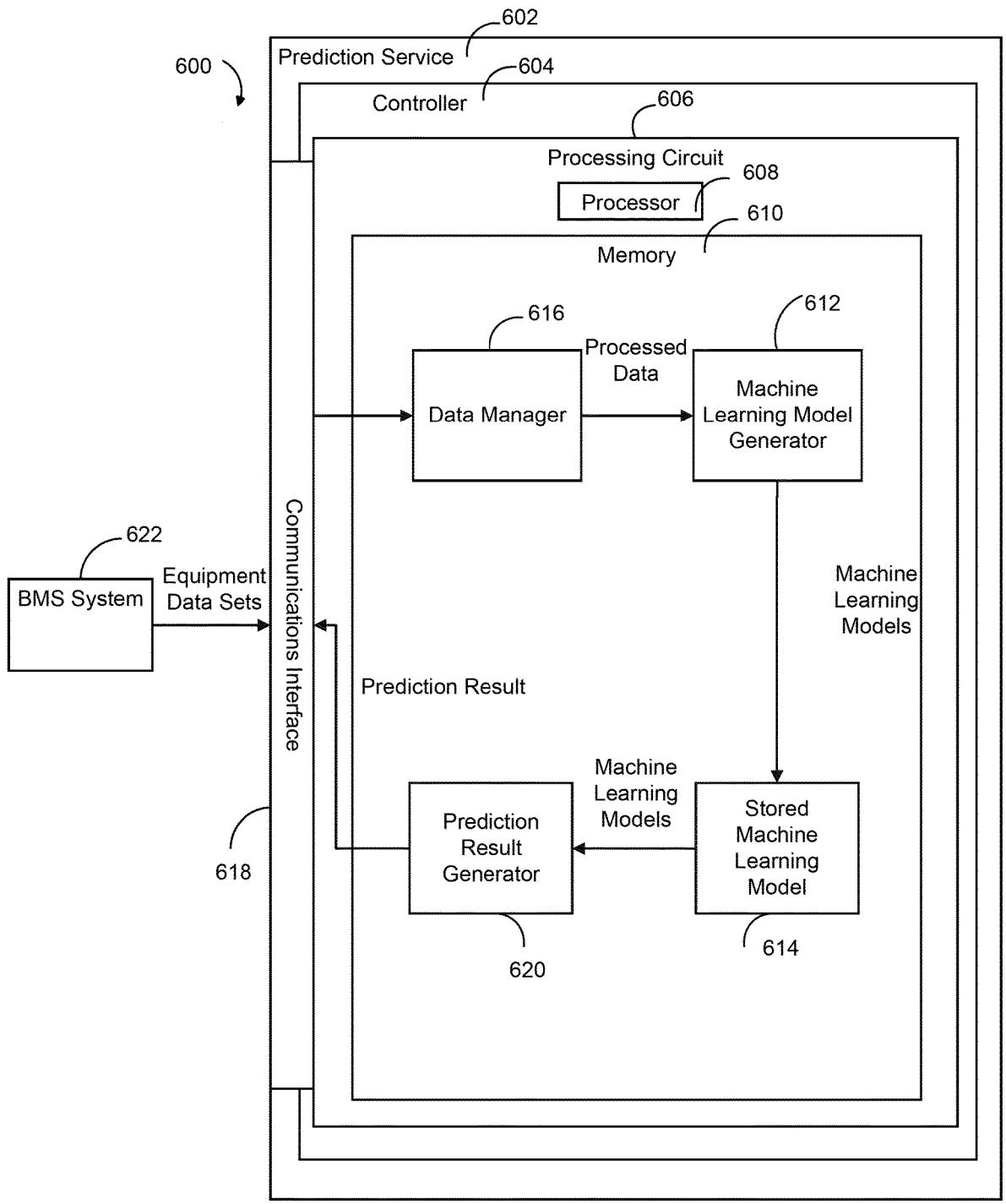
FIG. 6 is a block diagram of another BMS which can be used to monitor and control the building of FIG. 1, according to some embodiments.

Referring specifically to FIG. 5, a block diagram of data set abnormality controller 500 is shown, according to some embodiments. Data set abnormality controller 500 can be configured to analyze vibration data sets (or other types of data sets) to determine if the data sets include abnormalities that may be indicative of problems with building equipment (e.g., building equipment 520). In particular, data set abnormality controller 500 can utilize ML models to qualify vibration data sets as either normal or abnormal such that abnormal data sets can be further analyzed by an analyst. Vibration data sets As described in greater detail below, data set abnormality controller 500 can provide various benefits for a building system and employees associated therewith. In particular, by implementing the ML models for qualifying data sets, an efficiency of analysts that analyze data sets can be increased and a number of data sets the analysts are required to evaluate can decrease.

Data set abnormality controller 500 is shown to include a communications interface 508 and a processing circuit 502. Communications interface 508 may include wired or wireless interfaces (e.g., jacks, antennas, transmitters, receivers, transceivers, wire terminals, etc.) for conducting data communications with various systems, devices, or networks. For example, communications interface 508 may include an Ethernet card and port for sending and receiving data via an Ethernet-based communications network and/or a Wi-Fi transceiver for communicating via a wireless communications network. Communications interface 508 may be configured to communicate via local area networks or wide area networks (e.g., the Internet, a building WAN, etc.) and may use a variety of communications protocols (e.g., BACnet, IP, LON, etc.).

Communications interface 508 may be a network interface configured to facilitate electronic data communications between data set abnormality controller 500 and various external systems or devices (e.g., building equipment 520, analyst device 522, user device 524, etc.). For example, data set abnormality controller 500 may receive vibration data sets from building equipment 520 via communications interface 508.

Processing circuit 502 is shown to include a processor 504 and memory 506. Processor 504 may be a general purpose or specific purpose processor, an application specific integrated circuit (ASIC), one or more field programmable gate arrays (FPGAs), a group of processing components, or other suitable processing components. Processor 504 may be configured to execute computer code or instructions stored in memory 506 or received from other computer readable media (e.g., CDROM, network storage, a remote server, etc.).

Memory 506 may include one or more devices (e.g., memory units, memory devices, storage devices, etc.) for storing data and/or computer code for completing and/or facilitating the various processes described in the present disclosure. Memory 506 may include random access memory (RAM), read-only memory (ROM), hard drive storage, temporary storage, non-volatile memory, flash memory, optical memory, or any other suitable memory for storing software objects and/or computer instructions. Memory 506 may include database components, object code components, script components, or any other type of information structure for supporting the various activities and information structures described in the present disclosure. Memory 506 may be communicably connected to processor 504 via processing circuit 502 and may include computer code for executing (e.g., by processor 504) one or more processes described herein. In some embodiments, one or more components of memory 506 are part of a singular component. However, each component of memory 506 is shown independently for ease of explanation.

Memory 506 is shown to include a data set collector 510. Data set collector 510 can be configured to receive vibration data sets (or other types of data sets) from building equipment 520 (e.g., via communications interface 508). Building equipment 520 can include any equipment that operates to affect a variable state or condition of a building and/or other space. Specifically, building equipment 520 can operate to affect environmental conditions of the building and/or other space. As such, building equipment 520 may include, for example, chillers, boilers, air handling units, fire suppression equipment, etc. In some embodiments, building equipment 520 includes some and/or all of the subsystems of building subsystems 428 as described with reference to FIG. 4.

In some embodiments, vibration data sets are generated by sensors affixed to devices of building equipment 520 and/or otherwise capable of obtaining vibrational measurements of building equipment 520. A typical vibration data set may include timewave data indicating acceleration over time. In some embodiments, the timewave data is collected by accelerometers on different physical points on a building device. For example, a data set for a chiller may include vibration signals collected from locations of the chiller such as a compressor, an off-end motor, and a drive-end motor. In this example, vibration data can be collected in three sensor orientations (e.g., X, Y, and Z directions of three-dimensional space), thereby generating 9 timewaves in total. Each of the timewaves can be evaluated by a ML model (or multiple ML models) for accurate anomaly detection. This can ensure that if equipment faults are only detectable at certain locations and/or orientations of the device, the faults can nonetheless be detected. In some embodiments, the vibration data sets also includes information such as machine metadata, machine operating conditions, one or more time waveforms, relevant machine specifications (e.g., a line frequency, a number of impeller blades, a gear ratio), etc. Additional information other than raw vibration signals can help the ML model in determining frequencies and ranges where vibration signals may be expected. Vibration data sets are described in greater detail in U.S. patent application Ser. No. 15/993,331 filed May 30, 2018, the entirety of which is incorporated by reference herein. Vibration data sets are also described in greater detail in U.S. patent application Ser. No. 16/413,892 filed May 16, 2019, the entirety of which is incorporated by reference herein. In some embodiments, the systems and methods described herein can be implemented with the systems and methods described in the incorporated patent applications.

In some embodiments, data set collector 510 stores collected vibration data sets in a database 526. Database 526 is shown as a component of data set collector 510 for ease of explanation. Database 526 may be a separate component of data set abnormality controller 500 and/or may be separate from data set abnormality controller 500 altogether. For example, database 526 may be hosted by a cloud provider and hosted on a cloud computation system that data set abnormality controller 500 can communicate with. In this case, data set collector 510 may transmit and receive vibration data sets to and from the cloud computation system via communications interface 508. In any case, by storing vibration data sets in database 526, the vibration data sets can be saved and later used for other processes such as retraining an ML model for detecting abnormalities, displaying vibration data sets to analysts, etc.

Data set collector 510 can provide vibration data sets to data set preparation module 512. Data set preparation module 512 can prepare vibration data sets for being used as input to ML models 514. Dependent on a format of ML models 514, some ML models of ML models 514 may require vibrational data to be presented as input in a format other than raw vibration signals. As such, data set preparation module 512 can manipulate vibration data sets received from data set collector 510 to ensure data provided to ML models 514 is in a proper format and includes useful information.

In some embodiments, data set preparation module 512 performs fast Fourier transforms (FFTs) for each timewave associated with a vibration data set. The FFTs can represent the timewaves in a frequency domain such that the vibration data sets can be more easily processed by ML models 514. In some embodiments, each FFT for a timewave is calculated with a certain frequency range and resolution. In this way, specific equipment abnormalities can be identified and resolved. For example, motor shaft issues may only be detectable at lower frequencies and gear set faults may only be detectable at high frequencies. As such, data set preparation module 512 can compute an FFT that captures low frequency ranges to detect motor shaft issues and can compute an FFT that captures high frequency ranges at which the gear set faults are detectable.

As a result of performing the FFTs, FFT spectra can be generated by data set preparation module 512 for a vibration data set. An FFT spectrum may include compiled results of individual FFTs performed on the vibration data set. Each FFT spectrum may be specific to a particular range of frequencies and resolution. The particular range of frequencies and resolution for a particular FFT spectra can define a "type" of the FFT spectra. The FFT spectra can be provided to machine learning models 514 as inputs.

It should be noted that FFTs are given as an example of data preparation that can be performed to prepare vibration data sets (or other types of date sets) to be inputted to ML models 514. Computing FFTs for individual timewaves and using FFT spectra as input to ML models 514 can be useful if a large amount of historical data is unavailable. In some embodiments, other approaches for data preparation are utilized. For example, ML models 514, as described in detail below, may utilize time domain data as input. In this case, data set preparation module 512 can manipulate vibration data sets to be in a proper time domain format for input to ML models 514. As another example, data set preparation module 512 may perform discrete cosine transforms on the vibration data sets such that the vibration data sets can be analyzed by ML models 514. In general, data set preparation module 512 can perform processing on vibration data sets received from data set collector 510 to ensure input to ML models 514 is in a proper format. In some embodiments, if ML models 514 use raw vibration signals as input, data set preparation module 512 may or may not be a component of memory 506. In some embodiments, ML models 514 directly utilize timewave data as inputs to analyze vibration data sets which may or may not require data preparation by data set preparation module 512.

ML models 514 can include one or more ML models that can determine probabilities that a vibration data set (or other type of data set) includes at least one abnormality based on FFT spectra. For example, an ML model of ML model 514 may predict that a first vibration data set has a 30% probability of including an abnormality whereas a second vibration data set has a 70% probability of including an abnormality. In some embodiments, ML models 514 output a different indicator of abnormalities in vibration data sets. For example, an ML model of ML models 514 may output a binary decision (e.g., yes or no) indicating whether or not the ML model predicts that a vibration data set includes an abnormality.

ML models 514 can provide additional information for analysts to consider if evaluating machine health of building equipment 520. Insight provided by ML models 514 may include predicted health scores for specific machine components, a determination of important machine speeds, highlighting of regions of vibration spectra that need attention, etc. In this way, analyst efficiency in analyzing vibration data sets can increase by providing additional information beyond raw vibration data.

ML models 514 can also assess a condition of an entire device and indicate whether the device is functioning normally, or if the device is potentially abnormal and should be evaluated by a human analyst. In this way, ML models 514 can eliminate some vibration data sets from needing to be analyzed by an analyst, thereby increasing efficiency of the analyst. In some embodiments, if enough data is available, ML models 514 can be trained to automatically and accurately diagnose fault building equipment. However, if accuracy of all decisions is of high priority (e.g., to a user), some and/or all vibration data sets identified as being potentially abnormal may be evaluated by human analysts to ensure that diagnoses of equipment problems are accurate.

ML models 514 can may include a variety of ML models generated for various building devices of building equipment 520. For example, ML models 514 may include ML models for identifying/predicting abnormalities in vibration data sets for chillers, pumps, fans, etc. Generating models for different building equipment may be important if multiple devices are analyzed as certain devices may be associated with more vibrations as opposed to others. In other words, a normal amount of vibration for one building device may not be the same for a separate building device (e.g., a normal amount of vibration for a chiller may not be the same as for a boiler). As such, each building device and/or building device type can have a separate ML model for analyzing vibration data. In any case, an ML model of ML models 514 can evaluate vibration data collected from a building device and determine whether any of the vibration spectra (i.e., the FFT spectra) for the building device are abnormal. Results from vibration spectra can be aggregated to determine whether the entire dataset may be abnormal. In this way, output of ML models 514 can be used to filter out vibration datasets that are "normal" and do not need to be evaluated by a human analyst. In some embodiments, ML models 514 further detect specific types of faults or machine malfunctions, as opposed to generic abnormalities.

In some embodiments, the ML models of ML models 514 are convolutional neural networks (CNNs). CNNs can be useful particularly problems where local relationships within input data are important (e.g., image classification tasks). In other words, CNNs can be useful in cases where repeating patterns exist throughout a sample input. While analysis of vibration spectra may be complex, signatures of abnormal equipment function can often be detected visually in the frequency domain. As such, CNN models can be utilized to identify abnormal vibration signals can reliably automate a portion of vibration analysis. As described above, reduction in a number of data sets manually analyzed by analysts can allow the analysts to focus on suspected abnormal equipment and thus accommodate a larger volume of data. In terms of ML models 514, the CNNs may be used to classify one-dimensional inputs.

CNNs can include convolutional layers, activation layers, pooling layers, and fully connected layers. A convolutional layer can include a number of filters that can learn different features from an input. With specific regard to ML models 514, the filters may learn to recognize, for example, FFT peaks and peak patterns, regardless of whether they appear in input. Convolutional layers may result in parameter sharing as peaks and spectral patterns may repeat throughout an FFT spectrum sample.

Activation layers of CNNs can apply an activation function to their inputs. With regards to CNNs of ML models 514, the CNNs can utilize rectified linear unit (ReLU) activation layers why can apply the following activation function:

$$f(x)=\max(0,x)$$

where x is some input value.

Pooling layers of CNNs can downsample their input to decrease a complexity of the CNN model. Specifically, downsampling can reduce a number of parameters of the CNN model. For example, pooling layers may take maximum values across small regions of the input to reduce a number of variables across each small region to one (i.e., the maximum value).

Fully connected layers of CNNs can operate as ordinary neural networks and can be used at the end of a CNN to output a final class score. In this way, the fully connected layers can output abnormality probabilities based on the FFT spectra received from data set preparation module 512.

Each spectrum one-dimensional CNN models of ML models 514 can evaluate one type of FFT of the FFT spectra provided by data set preparation module 512. Machine specs and spectrum-specific info (e.g., location and orientation of a sensor that made the vibration measurement) can be incorporated in the final layers of each model. Spectrum CNN models can be trained on labeled historical data that is available (e.g., stored in database 526) so that the spectrum CNN models output a probability that a given spectrum is abnormal (i.e., is indicative of a machine fault). In some embodiments, the spectrum CNN models further predict a specific type of machine fault that is present based on the FFT spectra. For example, the spectrum CNN models may learn to associate certain FFT spectra patterns with specific component failures.

To achieve good performance of abnormality predictions, CNN models of ML models 514 may require a large amount of training data. However, obtaining a large number of labeled vibration datasets may not feasible for all equipment types, and so, data availability may be a limiting factor for extending the anomaly detection models. To mitigate data availability problems, the CNN models may be trained using transfer learning. With transfer learning, an ML model can be trained on one set of data and then applied to a separate set of data for which there may be significantly less data. The ML model can be fine-tuned on the new set of data, but the performance is helped significantly by what the ML model learns from the first set of data. Transfer learning may work especially well if fundamental features the CNN learns (e.g., FFT peaks) are the same for the two data sets.

As an example of transfer learning that can be used in training the CNNs, a spectrum CNN model for a first chiller type may be trained based at least partially on vibration data sets for a second chiller type. In this case, the spectrum CNN model can be trained based on the vibration data sets and/or CNN models for the second chiller type and fine-tuned based on vibration data sets for the first chiller type. Specifically, the spectrum CNN model can be initially trained based on the vibration data sets for the second chiller type. Some of the learned weights of the spectrum CNN model can be fixed prior to fine-tuning based on vibration data sets for the first chiller type. In this case, a number of layers of the spectrum CNN model that are fixed can be configurable by testing what layers being fixed results in the best performance. In this way, the spectrum CNN model can be trained to predict abnormalities in vibration data sets for the first chiller type using data for the second chiller type.

It should be appreciated that CNNs are given purely for sake of example. The ML models of ML models 514 can be based on any appropriate type of machine learning model that can be used to classify vibration data sets. For example, ML models 514 may include long short-term memory (LSTM) models, other recurrent neural networks, etc. Dependent on a type of ML model used, data set preparation module 512 may or may not be included in data set abnormality controller 500. Further, data set preparation module 512 may perform other operations as opposed to and/or in addition to FFTs. In this sense, data set preparation module 512 can be configured and customized to prepare data in a format that can be used as input by ML models 514.

In some embodiments, ML models 514 are optimized for recall (a percentage of faulty machines ML models 514 are able to detect) or precision (a percentage of building devices that ML models 514 classify as faulty that are actually faulty). As ML models 514 catch more fault (i.e., recall increases), a higher number of "false alarms" (i.e., building devices identified as faulty that are operating normally) may increase as well. In other words, as recall increases, precision may decrease and vice-versa.

Model performance of ML models 514 can be tuned by adjusting a probability threshold used to assign normal and abnormal labels to vibration data sets. A higher threshold may result in lower recall and fewer false positives, whereas a lower threshold may achieve high recall (e.g., near 100% recall) but may have more false positives. If a goal of a user and/or data set abnormality controller 500 is to catch as many equipment faults as possible (i.e., near-100% recall) and ensure no critical faults are missed by ML models 514, the probability threshold may be lowered to a value that helps decrease a probability of missed equipment faults. However, the probability threshold may be required to be over a predetermined minimum value (e.g., 10%, 20%, 50%, etc.) such that a number of vibration data sets manually analyzed by analysts is reduced. If an extremely low probability threshold is used (e.g., 0%, 1%, etc.), a large number of vibration data sets that can be safely classified as normal may be unnecessarily qualified as abnormal, thereby increase a workload on analysts. In other words, the probability threshold should be set (e.g., by a user, by data set abnormality controller 500, etc.) such that a number of "acceptable" data sets (i.e., data sets that do not indicate a fault) classified as normal by ML models 514 is maximized while a number of non-acceptable data sets (i.e., data sets that indicate a fault) classified as normal by ML models 514 is minimized.

In some embodiments, the probability threshold is selected respective to types of equipment faults that can occur. For example, equipment faults may be classified as either "alert" faults (i.e., minor faults) or "alarm"/"danger" faults (i.e., critical faults). In this case, alert faults may indicate some fault that may, for example, raise operational costs, but would not be catastrophic to a system if left unaccounted for. Alarm/danger faults, however, may indicate equipment faults that, if left unaccounted for, may result in very large increases in operational costs, system failure, and/or other significant outcomes for a system. Based on the equipment fault classifiers, the probability threshold for ML models 514 can be set respective of the classifiers. For example, a conservative probability threshold may be set such that effectively no alert faults or alarm/danger faults are misclassified as normal. As another example, a less conservative probability threshold for ML models 514 may be set such that a few alert faults may be misclassified but that no alarm/danger fault are misclassified. In some embodiments, the probability threshold is automatically adjusted by data set abnormality controller 500 based on feedback about misclassifications from a user and based on a tolerance for misclassified faults and false positives set by the user (or some other entity).

As a result of passing an FFT spectra for a vibration data set through ML models 514, a set of abnormality probabilities for the FFT spectra can be calculated and provided to an abnormality identifier 516. For a given FFT spectrum, a specific ML model associated with a frequency range (or other aspect) of the FFT spectrum can analyze the FFT spectrum to determine a probability that the FFT spectrum is abnormal. This process can be repeated for each FFT spectrum of the vibration data set such that abnormality identifier 516 can receive an abnormality probability for each FFT spectrum.

Based on a received set of abnormality probabilities for a vibration data set, abnormality identifier 516 can identify/determine whether the vibration data set is abnormal. Abnormality identifier 516 can identify whether the vibration data set is normal or abnormal through a variety of methods. In some embodiments, abnormality identifier 516 determines whether the vibration data set is normal or abnormal by identifying a maximum abnormality probability included in the set of abnormality probabilities. For example, if the FFT spectra of the vibration data set included three FFT spectrums which have respective abnormality probabilities of 10%, 30%, and 60% as determined by ML models 514, abnormality identifier 516 may identify 60% as the maximum abnormality probability. Abnormality identifier 516 can determine whether the maximum abnormality probability is greater than or equal to a threshold probability for abnormality and, if the maximum abnormality is greater than or equal to the threshold probability, can identify the vibration data set as abnormal. Taking the maximum abnormality probability of a received set of abnormality probabilities can be a computationally simple process and can ensure that the vibration data set is treated cautiously to reduce a change of mislabeling the vibration data set as normal if the vibration data set is abnormal.

In some embodiments, ML models 514 may act as a pass through from step 512 to remote computing system 528 through communications interface 508. Remote computing system 528 may be a cloud storage service or a remote server maintained offsite. In some embodiments, the remote computing system 528 is similar to machine learning models 514, and may be used to generate and store ML models in a similar way. In some cases, the data set is too big to efficiently be handled by machine learning models 514 and instead is sent to remote computing system 528. Remote computing system 528 may be a single computing system, or multiple systems.

In some embodiments, abnormality identifier 516 determines a label for the vibration data set based on a model. In this case, abnormality identifier 516 can provide each abnormality probability of the received set of abnormality probabilities to the model to determine whether to classify the vibration data set as normal or abnormal. The model used by abnormality identifier 516 may include a supervised learning algorithm such as, for example, a logistic regression model, a support vector machine (SVM) model, decision trees, etc. Specifically, the model used by abnormality identifier 516 can determine a final probability based on each abnormality probability and can compare the final probability to the threshold probability. Using the model can be helpful in more accurately classifying vibration data sets as normal or abnormal. In particular, using the model in abnormality identifier 516 can reduce an impact of high outlier probabilities in the set of abnormality probabilities. For example, if a first FFT spectrum is associated with an abnormality probability of 80% whereas all other FFT spectra associated with a vibration data set have an abnormality probability less than 5%, the first FFT spectrum may have been misidentified by an ML model of ML models 514. In this example, using the maximum probability may unnecessarily qualify the vibration data set as abnormal whereas the model may determine a final probability that qualifies the vibration data set as normal.

The model utilized by abnormality identifier 516 can be trained to learn which features are particularly important for arriving at a correct label of normal or abnormal for a vibration data set. In some embodiments, the model accounts for differences in how the output probabilities of different models of ML models 514 are calibrated. In some embodiments, the model accounts for additional information such as machine specification values (e.g., gear ratio, line frequency, etc.) to better classify vibration data sets.

In some embodiments, abnormality identifier 516 includes business logic and/or auditing capabilities for further analyzing vibration data sets. In effect, abnormality identifier 516 may include any appropriate functionality for labeling vibration data sets as normal or abnormal. Abnormality identifier 516 is described in greater detail below with reference to FIG. 9.

Based on a received set of abnormality probabilities, abnormality identifier 516 can label an associated vibration data set as normal or abnormal. If abnormality identifier 516 labels the vibration data set as normal, the vibration data set can be provided to a report generator 518 as described in greater detail below. However, if abnormality identifier 516 labels the vibration data set as abnormal, abnormality identifier 516 can provide the abnormal vibration data set to an analyst device 522.

Analyst device 522 can be any device associated with an analyst that can allow the analyst to view a vibration data set and provide feedback about the vibration data set. As such, analyst device 522 may include one or more personal computing devices associated with the analyst. Analyst device 522 may include any wearable or non-wearable device. Wearable devices can refer to any type of device that an individual wears including, but not limited to, a watch (e.g., a smart watch), glasses (e.g., smart glasses), bracelet (e.g., a smart bracelet), etc. Analyst device 522 may also include any type of mobile device including, but not limited to, a phone (e.g., smart phone), a tablet, a personal digital assistant, etc. In some embodiments, analyst device 522 includes other computing devices such as a desktop computer, a laptop computer, etc. Analyst device 522 can be configured to display a graphical user interface including vibration data sets to the analyst and receive user input to the graphical user interface. In some embodiments, analyst device 522 includes a touchscreen. Analyst device 522 may be communicable with the data set abnormality controller 500 via a network, for example a WiFi network, a Bluetooth network, a cellular network, etc.

Via analyst device 522, the analyst can provide analyst feedback. Specifically, the analyst may indicate whether a vibration data set classified as abnormal by abnormality identifier 516 is actually abnormal in the opinion of the analyst. If the analyst indicates the vibration data set is normal, the vibration data set can be provided to report generator 518 such that report generator 518 can generate a "normal" report. However, if the analyst indicates the vibration data set is correctly classified as abnormal by abnormality identifier 516, various corrective actions may be taken to address the abnormality. In some embodiments, one corrective action is to provide the abnormal data set to report generator 518 to generate a report detailing the abnormality. In some embodiments, corrective actions such as maintenance, replacement, and/or other repairs of building equipment 520 may be initiated. For example, a specific building device of building equipment 520 may be scheduled to be replaced based on the analyst indicating an abnormality exists. Corrective actions may be initiated by the analyst via analyst device 522, automatically by abnormality identifier 516 and/or another component of data set abnormality controller 500, and/or by any other entity authorized to initiate corrective actions. In some embodiments, abnormality identifier 516 initiates a corrective action upon identifying the vibration data set as abnormal. In some embodiments, however, abnormality identifier 516 may be restricted in what corrective actions can be taken prior to confirming abnormality with the analyst. In this case, providing the vibration data set to the analyst may be considered a corrective action. Other valid corrective actions abnormality identifier 516 may initiate may include providing the vibration data set to report generator 518 to generate an initial abnormal report for the vibration data set, alerting a user of user device 524 that abnormality may be present, etc. Abnormality identifier 516 may be restricted, for example, from initiating a corrective action to replace building equipment before confirming abnormality with the analyst.

In some embodiments, analyst device 522 may set a periodic update timer for data set abnormality controller 500. It may initiate the collection of data from building equipment 520 through data set collector 510, and the generation of models in machine learning models 514 and/or other process of the data set abnormality controller 500.

In some embodiments, abnormality identifier 516 provides abnormal data sets to multiple analyst devices 522. In this case, multiple analysts can review the abnormal data sets and provide feedback. Providing abnormal data sets to multiple analysts can reduce a chance that vibration data sets are mislabeled by analysts. For example, one analyst may accidentally misinterpret an abnormal data set provided by abnormality identifier 516 as normal, thereby missing an equipment fault. However, if the abnormal data set is provided to multiple analysts, the other analysts may detect the equipment fault in the abnormal data set. In some embodiments, if multiple analysts provide feedback on a supposedly abnormal data set, a predetermined percentage of analysts (e.g., 10% of analysts, 30% of analysts, 60% of analysts, etc.) may be required to indicate the supposedly abnormal data is truly abnormal for a corrective action to be initiated. In some embodiments, only one analyst (or another predetermined number of analysts) is required to indicate abnormality in a data set for a corrective action to be initiated.

Labeled vibration data sets can be provided to report generator 518. Based on a vibration data set, report generator 518 can automatically generate a report that can be provided to a user (e.g., a customer) of user device 524. In some embodiments, user device 524 is similar to and/or the same as analyst device 522. As such, user device 524 may be or include, for example, wearable devices, desktop computers, mobile devices, etc.

If a received vibration data set is labeled as normal, report generator 518 may generate a normal report indicating that building equipment is operating normally. If a received vibration data is labeled as abnormal (e.g., as indicated by an analyst), report generator 518 may generate an abnormal report detailing the abnormality. Abnormal reports may include various information that may be helpful to the user. For example, the abnormal report may include what building device of building equipment 520 is experiencing a fault, possible corrective actions that can be taken to address the fault, etc. In effect, the abnormal report can include any information that can help the user make an informed decision on how to proceed with regards to the fault.

In some embodiments, ML models are generated by ML models 514 based on a data set provided by data set preparation module 512 and stored for future use. Stored ML models may be stored in memory 506 but also sent using communications interface 508 to remote computing system 528 and stored there. When communications Interface 508 receives a request from the user device 524 ML models 514 retrieves the stored ML models from either the memory 506 or the remote computing system 528 and ML model 514 may execute the retrieved ML models to predict at least one abnormality, such as a fault.

Integrated Prediction Services

Referring generally to FIGS. 6-9, systems and methods for identifying and predicting faults in building equipment using machine learning are shown, according to some embodiments. Specifically, FIGS. 6-9 may relate to periodically generating ML models that can be recalled for future use. The models can be recalled and restored for much less time and not delay other systems and processes of the building management system. By generating the ML models automatically such as in a background process, the ML models can be used to respond to a prediction request without having to be regenerated each time. It should be appreciated that generating, storing, and recalling ML models in this way can be applied to data sets beyond the vibration data sets that are provided for purposes of example only. Other types of data sets are contemplated in the present disclosure as well.

Modeling of data sets can be an important tool in identifying mechanical issues in a building. Machine learning can be utilized to reduce the amount of data analysis required for human analysis. As such, it is important to facilitate the use of machine learning models in building management systems to reduce the time and money spent on generating new machine learning models as a prediction request is received. By implementing stored ML models that are updated periodically (say every week) money and time can be saved for the company (e.g., by reducing the cost of cloud operations and time devoted to waiting for models to generate a response), among other benefits. In some embodiments, the models may be generated in the cloud by a remote computing system, and then downloaded to the local BMS system for storage. Modern BMS systems are quite advanced and may collect a vast amount of data. A large amount of data is also required to generate models that provide useful predictions. As such, in some embodiments when the amount of data being processed is quite large the prediction service may send the data through the internet to a remote computing system to process the data and generate the model. This many of the problems associated with generating models locally, it offloads the computing task and saves memory storage space. The models can then be quickly rebuilt locally in response to a prediction request from a user. Rebuilding the models is much faster and efficient then generating new models, and the prediction request can be generated in a more economical manner.

In some embodiments, the machine learning models may be generated and stored on the cloud. The cloud may be a remote server or remote computing system. The cloud may be integrated within the BMS system or external to the system. The models may then be recalled by the BMS service when the prediction request is received. The models and their associated data are sometimes quite large, and storing them in a remote computing system allows the BMS to operate in a more efficient manner.

Still in other embodiments, it should be appreciated that the models may be generated and/or stored locally within the BMS system. This allows the locally generated models to still be recalled quickly upon receiving a prediction request, and avoiding having to re-generate models in response.

Figure 7:
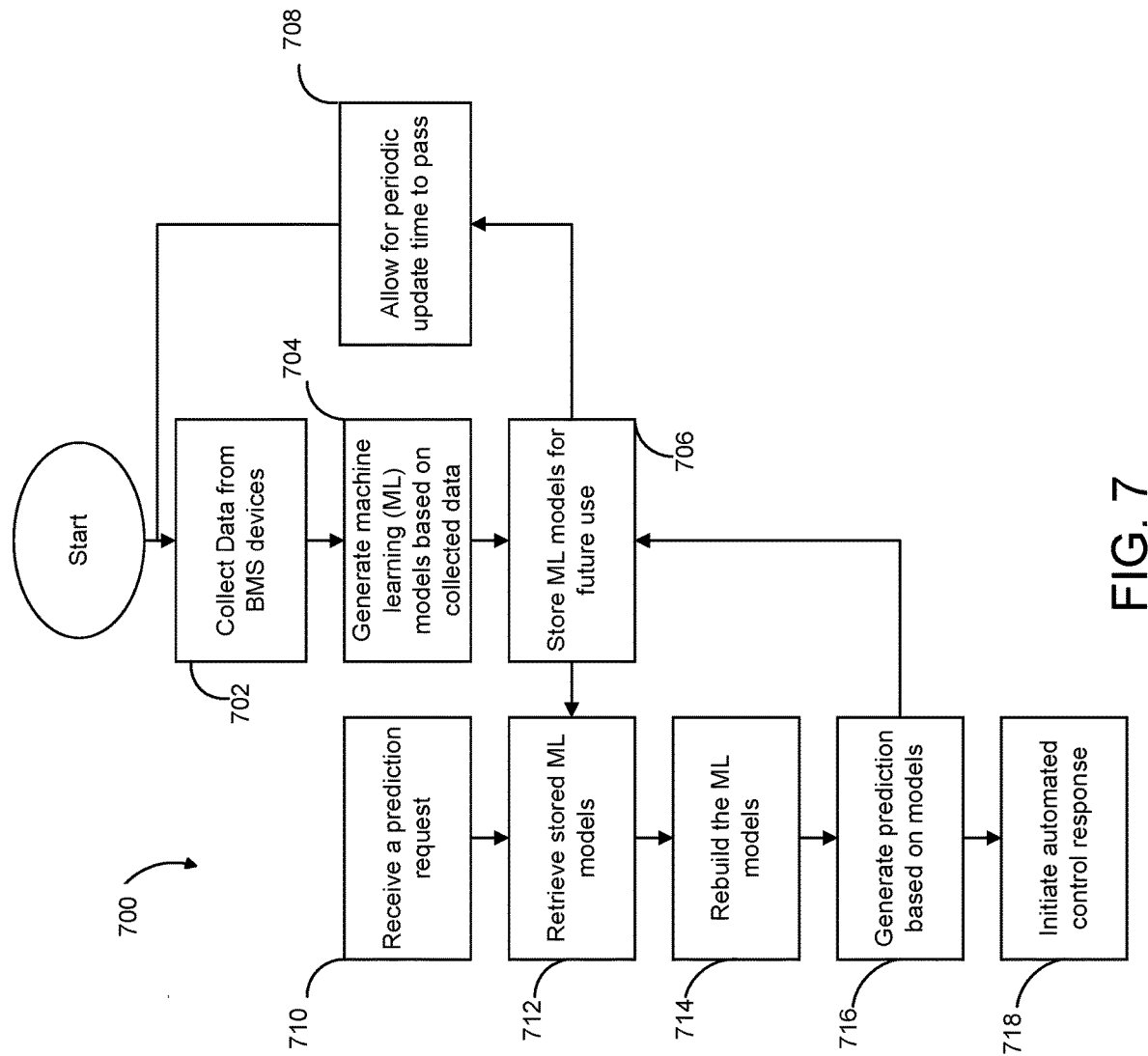
FIG. 7 is a flow diagram of a process of generating and retrieving machine learning models for a BMS, according to some embodiments.

Referring now to FIG. 7, a flow diagram of a process 700 for generating predictions based on machine learning models is shown, according to some embodiments. Process 700 can outline how data set abnormality controller 500 or prediction service 602 can operate to analyze data sets to determine if a fault exists or will exist. Process 700 is shown to include collecting equipment data from BMS devices (step 702). The BMS devices can be individual devices, groups of devices, individual BMS subsystems or all BMS devices in a BMS system. The data collected can include vibration data, temperature data, power usage data, and/or equipment parameters such as on/off state and/or any other data that can be collected from BMS devices or subsystems.

The data collected can be for any period of time. In some embodiments, a large amount of data is initially required to generate useful models, and a year or more worth's of operating data may be collected. In other cases, after the initial generation, the collected data may be just for a few days and used to update and regenerate the pre-existing models. In some embodiments, this time interval depends on the periodic update timer of step 708. In some embodiments, step 702 may be performed by data set abnormality controller 500, prediction service controller 604, and/or components therein.

Process 700 is shown to include generating a machine learning model based on the collected equipment (step 704). The machine learning models may be FFTs or CNNs, though it should be appreciated that the models may be generated using other machine learning methods as well. The machine learning models may indicate when a BMS device, subsystem, or system is predicted to fail. In some embodiments, step 704 is performed by machine learning models 514 and/or model generator 612. In some embodiments, step 704 is performed by remote computing system 528 or another networked system. When date sets from BMS devices are extremely large, it can be advantageous to generate the machine learning models on a remote computing system. Generating the models on the remote computing system can help achieve faster modeling times.

Process 700 is shown to include storing the machine learning models for future use (step 706). The machine learning models may be stored locally, in some embodiments within the machine learning models 514, in some embodiments model storage 614 or any other memory device. For example, the models may be stored in libraries like tensorflow's saver class to store a tensorflow model or in pickle to store a prophet model. It should be understood that this libraries are provided for purposes of example only and other libraries may be used to store the models as well. Step 706 can also store the machine learning models on a remote computing device by transmitting the models to the remote computing device. In some embodiments, step 706 is performed by machine learning models 514 and/or model storage 614.

Process 700 is shown to include triggering a periodic update timer (step 708). The update timer can be determined by a user input or by the by one or more computer systems within a BMS such as BMS system 622, in some embodiments. In some embodiments, step 708 is performed by data manager 616 and/or data set collector 510. The periodic timer may be an hour or a year, or any other period of time. Importantly, the cycle of collecting data, generating a machine learning model, storing the model, and triggering the periodic update timer repeats and in some embodiments is independent of request for a prediction result (step 710). In some embodiments, the periodic timer is based on the amount of data collected instead of a time period. In some embodiments, the timer is only seconds long. In some embodiments, a first model is stored according to 706 at a first time interval. At a later time the process 700 receives the prediction request from step 710. The process 700 then proceeds through steps 710 to 718. Process 700 is shown to be independent of steps 710 to 718 and to include returning to step 702 after the periodic update timer has elapsed in step 708. Step 708 includes performing such a step to complete a loop allowing for the periodic update of the machine learning models by the machine learning models 514 and/or the model generator 612.

Process 700 is shown to include receiving a prediction request (step 710). In some embodiments, the prediction request is an application programming interface (API) request for prediction. In some embodiments, the request is received through communications interface 508 and/or communications interface 618. The prediction request may also contain current data true and a time stamp. If so the request can obtain the current data from the BMS devices that is collected in step 702. If there is no data the request may simply retrieve the last updated data set available in a cache or database within the BMS system by calling a read API. In some embodiments, step 710 is performed by data set collector 510 and/or data manager 616.

Process 700 is shown to include retrieving the stored machine learning models (step 712) from step 706. The models may be retrieved by reading a local memory storage device or by requesting the models from a remote computer system, in some embodiments, remote computing system 528. In some embodiments, step 712 does not involve generating a model as in step 704. In some embodiments, step 712 involves retrieving the stored models generated by steps 702-708, independently of the request of step 710 or the attempt to retrieve the model at step 712. In some embodiments, step 712 is performed by machine learning models 514 and/or prediction generator 620. In some embodiments, not shown step 706 is not performed and the models are maintained on the remote computer system.

Process 700 is shown to include rebuilding the machine learning models (step 714). The machine learning models may need to be rebuilt, although it is contemplated that the models may also be stored in their entirety. In such embodiments the models need only be retrieved to be used to generate predictions. In some embodiments, step 714 is performed by machine learning models 514 and/or prediction generator 620.

Process 700 is shown to include generating predictions based on the models (step 716). The predictions generated using the models can be fault predictions for a BMS device, subsystem or system or any other component of a BMS. The predictions may also include generating a temperature or power usage prediction, or any other prediction that can be generated based on the machine learning models. The predications can be generated using both the machine learning models and the current data retrieved by the prediction request. In some embodiments, there may be a diagnosis associated with the prediction, the diagnosis aiding in taking preventative measures to prevent predicted fault from occurring.

Process 700 is also shown to include initiating an automated control response (step 718). The automated control response may include performing automated control actions based on the diagnosis to prevent a predicted fault from occurring. In some embodiments, the automated control response includes transmitting a notification to a user indicating the first response. In some embodiments, the automated control response includes generating and displaying a GUI based on a prediction. In some embodiments, the automated control response of step 718 involves performing an automated control action based on the prediction to prevent a fault from occurring. The automated control action may include (i) entering the BMS devices into safety mode, (ii) operating the BMS devices at a derated state, (iii) and shutting down the BMS devices. In some embodiments, step 718 may be performed by report generator 518 and or/prediction generator 620.

Figure 8:
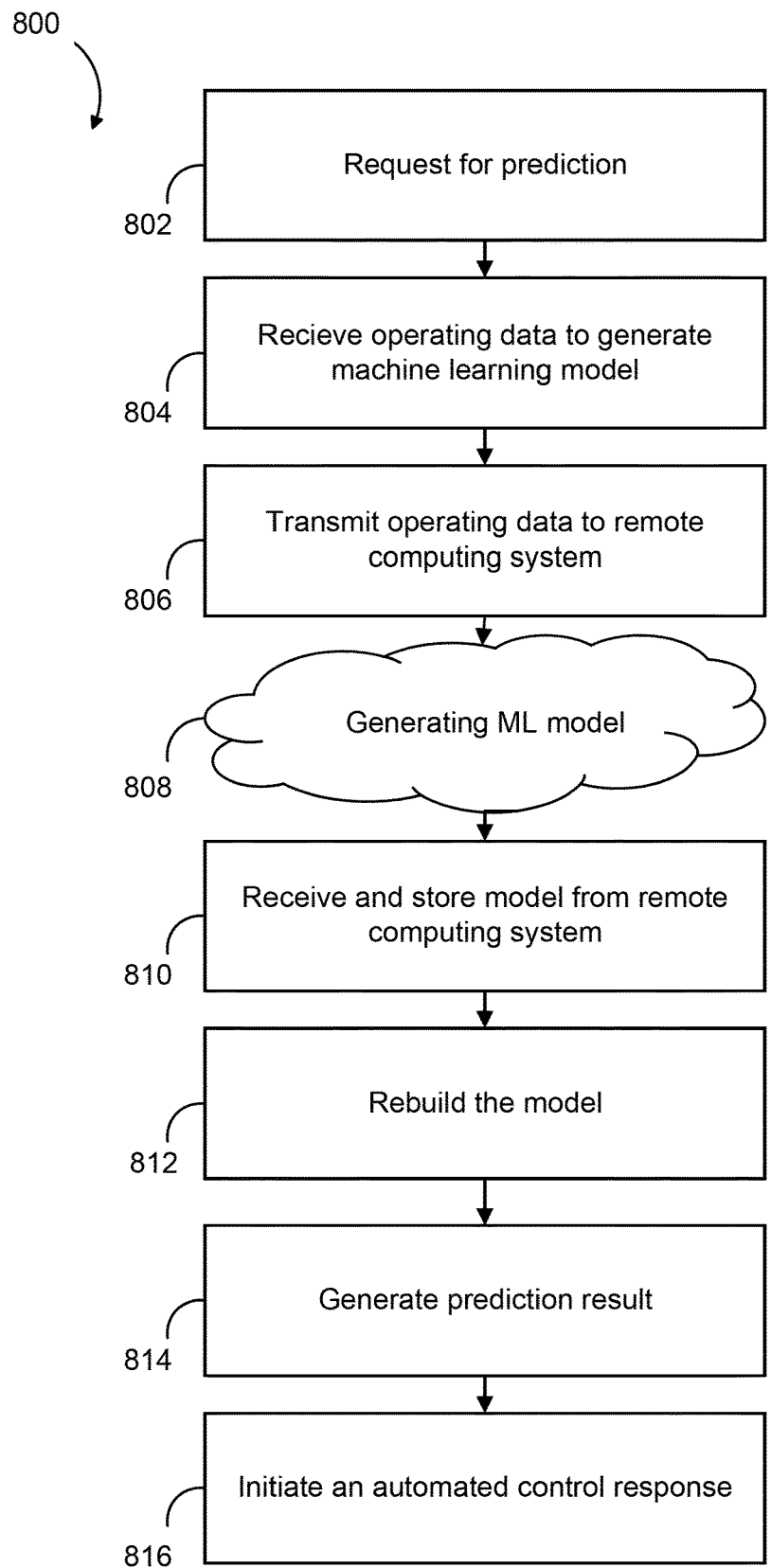
FIG. 8 is a flow diagram of a process for retrieving and rebuilding pre-generated machine learning models on the cloud, according to some embodiments.

Referring now to FIG. 8, a flow diagram of an example process 800 for generating a prediction based on machine learning models is shown. In particular, process 800 may illustrate an example of generating prediction results in a first instance using the cloud, though it should be understand that any process done in the cloud could also be completed locally within the BMS system. The cloud may be a remote computing system or remote server.

Process 800 is shown to include receiving a request for a prediction (step 802). The request may be an API request for prediction. In some embodiments, the request is received by prediction service 602. In some embodiments, the request may also be generated a user input from a user device 524.

Process 800 is shown to include receiving operating data to generate machine learning model (step 804). The operating data may be received from a single BMS device, a BMS subsystem, or even an entire BMS system. The operating data may include vibration, temperature, pressure, humidity, or other types of data sets. The operating data may also include equipment on/off states, equipment operating capacities, and/or any other information that can be used by a building management system controller to monitor and control BMS devices. In some embodiments, step 804 is performed by data set collector 510 and/or data manager 616.

Process 800 is shown to include transmitting the operating data to a remote computing system (step 806). It should be understand that transmitting the data to a remote compute system is by example only. The data could also be retained for use in the local BMS system. In some embodiments, step 806 is performed by communications interface 508 and/or communications interface 618.

Process 800 is shown to include generating the ML model (step 808). Step 808 is similar and/or identical to machine learning models 514 and may in some embodiments perform the same function. It should be understood that though step 808 is shown to be a remote computing system like the cloud, step 808 can also be completed locally within a BMS system.

Process 800 is shown to include receiving and storing model from remote computing system (step 810). The model may be stored locally in a memory storage device such as memory 506 and/or memory 610. In some embodiments, step 810 is performed by machine learnings models 514 and/or model storage 614.

Process 800 is shown rebuilding the model (step 812). The model can be a model that was generated and stored by machine learning models 514 and/or model generator 612. In some embodiments, step 812 is performed by machine learning models 514 and/or prediction generator 620. In some embodiments, the model is retrieved from a local memory storage device such as memory 506 and/or a component there in. In some embodiments, the model is retrieved from a remote computing system such as remote computing system 528. The model may also be rebuilt on the remote computing system before it is retrieved to further save time and cost. In some embodiments, step 812 is performed by machine learning models 514 and/or prediction result generator 620.

Process 800 is shown to include generating a prediction result (step 814). As in step 716, the prediction result may be a fault result or any other result that can be generated based on a machine learning model. In some embodiments, step 814 is performed by abnormality identifier 516 and/or prediction generator 620.

Process 800 is shown to include initiating an automated control response (step 816). The automated control response can simply be returning to the source of the prediction request in a REST API return containing the prediction. In some embodiments, step 816 is similar to and/or the same as step 718 as described in reference to FIG. 7. The automated control response may include transmitting a notification to a user, for example to user device 524. In some embodiments, step 816 may include generating a GUI based on the first prediction. In some embodiments, step 816 may include performing an automated control action based on the prediction, the action can be adjusting the setpoints of a BMS device or devices, entering the BMS devices into a safety mode, operating the BMS devices in a derated state, and/or shutting down the devices. In some embodiments, step 816 may be performed by report generator 518 and or/prediction result generator 620.

Figure 9:
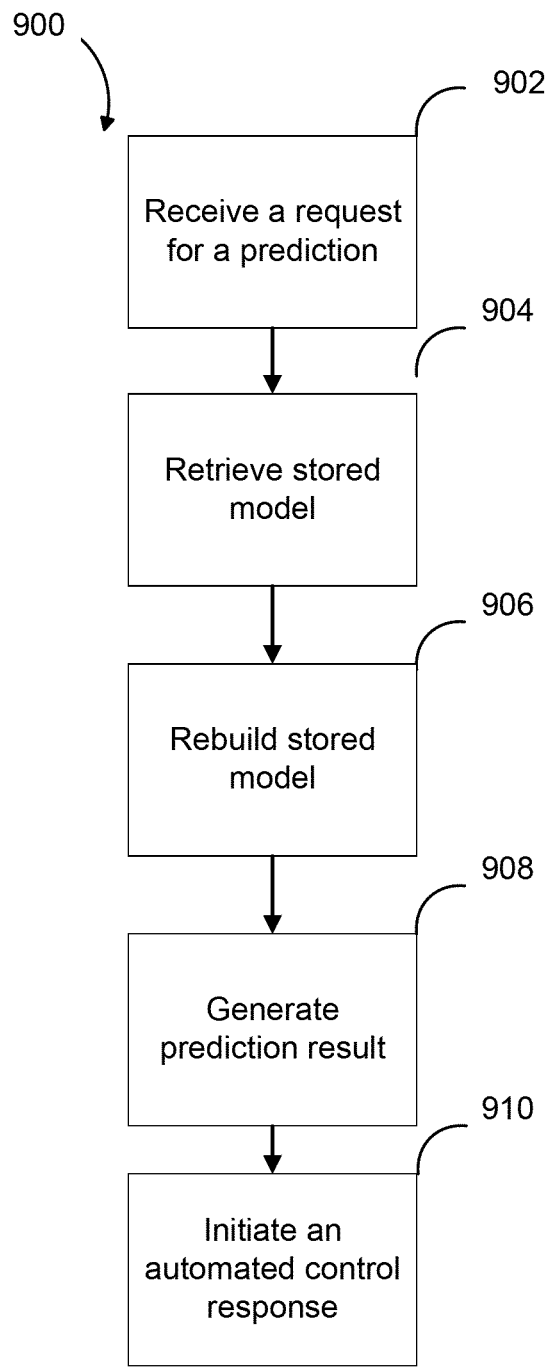
FIG. 9 is a flow diagram of a process for retrieving and rebuilding pre-generated machine learning models, according to some embodiments.

Referring now to FIG. 9, a flow diagram example of process 900 for generating a prediction based on machine learning models is shown. In particular, process 900 can illustrate an example of generating prediction results based on an already created machine learning model. In some embodiments, some or all steps of process 900 are performed by data set abnormality controller 500. In some embodiments, some or all steps of process 900 are performed by prediction service 602.

Process 900 is shown to include receiving a request for a prediction (step 902). The request may be an API request for prediction. In some embodiments, the request is received by prediction service 602. In some embodiments, the request may also be generated a user input from a user device 524.

Process 900 is shown to include retrieving model (step 904). The model can be a model that was generated and stored by machine learning models 514 and/or model generator 612. In some embodiments, step 904 is performed by machine learning models 514 and/or prediction generator 620. In some embodiments, the model is retrieved from a local memory storage device such as memory 506 and/or a component there in. In some embodiments, the model is retrieved from a remote computing system such as remote computing system 528.

Process 900 is shown to include rebuilding a machine learning model (step 906). Process 900 does not include a step similar to step 704 in process 700 that requires actually generating the models, and is therefore representative of a process for generating predictions after a first model is already generated and stored by process 700 or some other process. The model may also be rebuilt on the remote computing system before it is retrieved to further save time and cost. In some embodiments, step 906 is performed by machine learning models 514 and/or prediction result generator 620.

Process 900 is shown to include generating a prediction result (step 908). As in step 716, the prediction result may be a fault result or any other result that can be generated based on a machine learning model. In some embodiments, step 908 is performed by abnormality identifier 516 and/or prediction generator 620.

Process 900 is shown to include initiating an automated control response (step 910). In some embodiments, step 910 is similar and/or identical to step 816. The automated control response can simply be returning to the source of the prediction request in step 710 a REST API request containing the prediction. In some embodiments, step 910 is similar to and/or the same as step 718 as described in reference to FIG. 7. In some embodiments, step 910 may be performed by report generator 518 and or/prediction generator 620.

Figure 10:
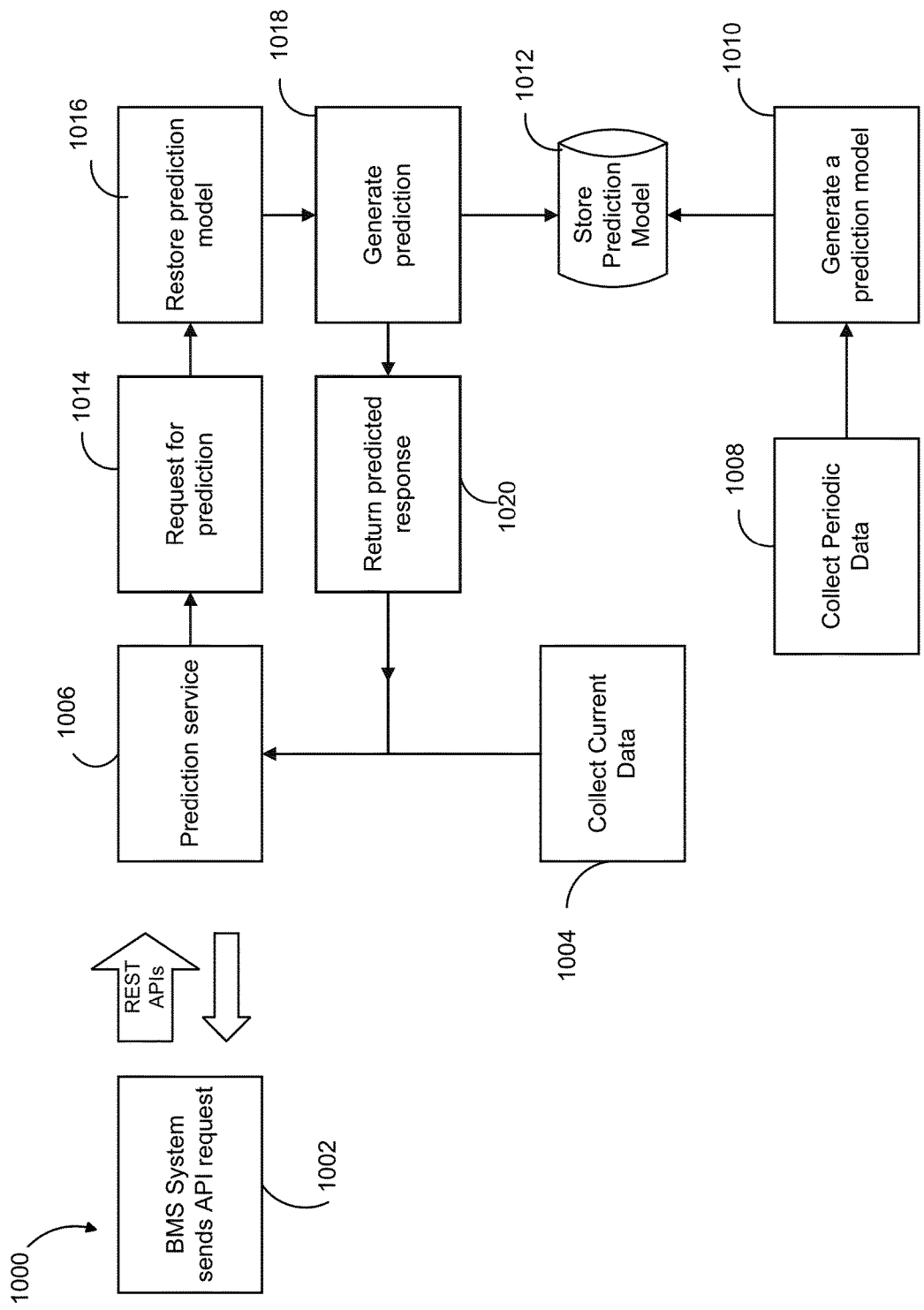
FIG. 10 is a flow diagram of a generic architectural solution to integrate a prediction service into a BMS.

Referring now to FIG. 10, a flow diagram of a process 1000 for integrating machine learning models into a building management system with less time and money required is shown. In some embodiments, process 1000 is similar to process 700 and process 900. In some embodiments, process 1000 is performed by data set abnormality controller 500 and/or prediction service 602.

Process 1000 is shown to include a BMS system that sends an API request to the prediction service (step 1002). The BMS system request may be an API request such as a REST API request for prediction. The Prediction service can be integrated in the BMS system or a standalone object-service. In some embodiments, step 1002 is performed by BMS system 622.

Process 1000 is shown to include collecting current data (step 1004). The current data may be data stored in a chase or other memory storage device of the BMS. The data may also be stored on a remote computer system. In some embodiments, the data will be collected by calling read API to get the data from a memory storage device. In some embodiments, step 1004 is performed by data set collector 510 and/or data manager 616.

Process 1000 is shown to include prediction service (step 1006). The prediction service can act as any other service in a BMS system or control system. In some embodiments, it may also maintain a cache of current data that is collected in step 1004. The prediction service then receives the data and generates a request for prediction. Like other control systems in a BMS the prediction service in step 1006 may include authenticating a user. In some embodiments, prediction service in 1006 may collect the data in the cache if requested by the API request. If the cache is empty the prediction service in 1006 may call read API to get the data from step 1004. In some embodiments, the prediction service may be located locally in a BMS control system or in others it may be in a remote computing system. The prediction service may be accessed by a range of BMS devices and control services, including analyst device 522 or user device 524. In some embodiments, step 1006 is performed by data set abnormality controller 500 and/or components within. In some embodiments, step 1006 is performed by prediction service 602.

Process 1000 is shown to include collecting periodic data (step 1008). The periodic data may be data gathered automatically by the BMS, and may be used to update the machine learning model (e.g., to adopt the latest trends or seasonality changes). The period of collection may be an hour or a year or any other length of time. The length of the period of collection may be determined by a user input. In some embodiments, the data is collected on a remote storage device so as to provide more storage space in a BMS system. Step 1008 is similar and/or identical to 702. In some embodiments, step 1008 is performed by data set collector 510 and/or data manager 616.

Process 1000 is shown to include generating a prediction model (step 1010). In some embodiments, the model is generated by the machine learning models 514. In some embodiments, the model is generated on a remote computing system 528. Step 1010 is similar and/or identical to step 716 described in reference to FIG. 7. In some embodiments, step 1010 is performed by machine learning models 514. In some embodiments, step 1010 is performed by model generator 612. In some embodiments, the model is generated at a first time before the request for prediction is sent in step 1002. In some embodiments, step 1010 may generate a model at the same time as step 1006 sends a request for prediction. However, in some embodiments step 1010 is not related to step 1006 and the model is generated independently of when a request is made. Advantageously, when the model is generated based on the periodically collected data the model is then available for use immediately after a prediction request is sent in step 1006. The model is also updated according to more recent date collected in step 1008. Therefore, a model is no longer required to be generated in response to each request for prediction, shorting the time required to receive a prediction and the associated costs.

Process 1000 is shown to include storing a prediction model (step 1012). Step 1012 is similar and/or identical to step 706 described in reference to FIG. 7. The prediction model may be stored on a remote computer system or in other embodiments on a local memory storage device. In some embodiments, step 1012 is performed by remote computing system 528 and/or machine learning models 514. There are several advantages to storing a model, in some embodiments the model is now available whenever required. In some embodiments, the model can be restored and rebuilt in much less time and for much less cost. Rebuilding a pre-generated model will also avoid the operational cost of preparing prediction models whenever a request for a prediction is received. In some embodiments, step 1012 is performed by model storage 614.

Process 1000 is shown to include a request for prediction (step 1014). The request for prediction may be the same request sent by the BMS system. It may be a REST API request or another type of request that can be sent by the prediction service in 1006. In some embodiments, step 1014 is performed by analyst device 522 and/or user device 524. Still in others it is performed by BMS system 622.

Process 1000 is shown to include restoring a prediction model (step 1016), generating a prediction (step 1018) and returning a prediction response (step 1020). Step 1016 is similar and/or identical to steps 712 and 714, and step 1018 is similar and/or identical to step 716, and step 1020 is similar and/or identical to step 718, all described herein with reference to FIG. 7.

In some embodiments, step 1016 includes restoring a prediction model by first requesting the model from a memory storage device. In some embodiments, the memory storage device may be within data set abnormality controller 500 or the remote computing system 528. In some embodiments, step 1016 is performed by machine learning models 514 and/or prediction generator 620.

Figure 11:
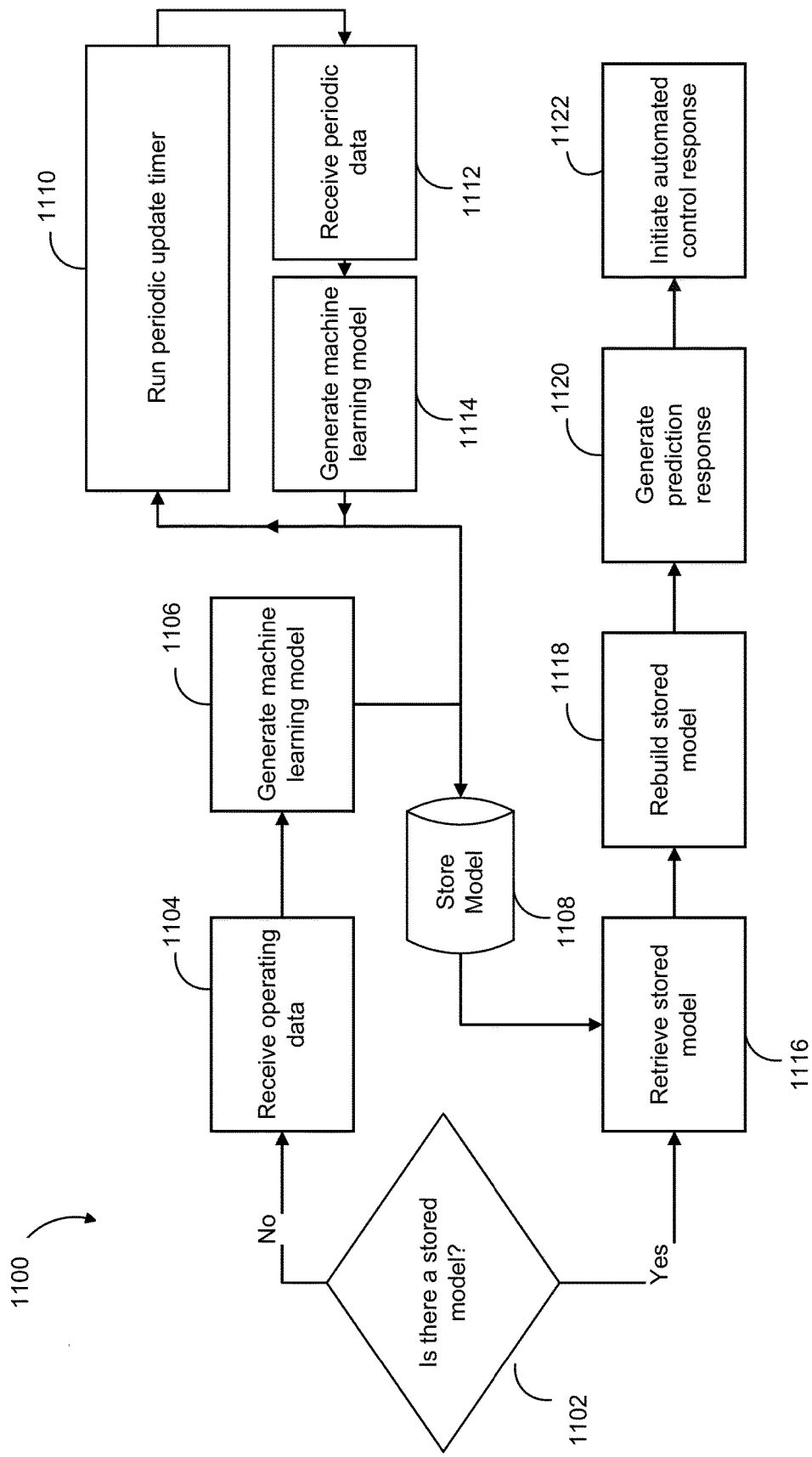
FIG. 11 is a flow diagram of a process for retrieving and rebuilding pre-generated machine learning models, according to some embodiments.

Referring now to FIG. 11, a flow diagram of a process 1000 for integrating machine learning models into a building management system with less time and money required is shown. In some embodiments, process 1000 is similar to process 700 and may include in part processes 800 and 900. In some embodiments, process 1000 is performed by data set abnormality controller 500 and/or prediction service 602.

Process 1100 is shown to include determining if there is a stored model step (1102). If there is no stored model (step 1102 "NO"), process 1100 can proceed to step 1104. If there is a stored model (step 1102 "YES"), process 1100 can proceed to step 1116.

Process 1100 is shown to include steps 1104-1108 that are similar and/or identical to steps 702-706 of FIG. 7.

Process 1100 is shown to include running a periodic update timer (step 1110). The length of the update timer may be defined by a user input or by a BMS system automatically. The update timer begins after step 1106 when the model is first generated. In some embodiments, step 1110 is performed by data set abnormality controller 500 and/or prediction service 602.

Process 1100 is shown to include receiving periodic data (step 1112) and generating machine learning model (step 1114). Step 1112 is similar and/or identical to step 1104. In some embodiments, the data collected in step 1112 is the operating data generated by the BMS device, subsystem, or system that has been collected after step 1104 was completed. In some embodiments, step 1112 includes the operating data collected in step 1104 and new data collected after step 1104 was processed. Step 1114 is similar and/or identical to step 1106.

Process 1100 is shown to include retrieving stored model (step 1116), rebuilding stored model (step 1118) generating a prediction response (step 1120), and initiating an automated control response (step 1122). Steps 1116-1122 are similar and/or identical to steps 904-910.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS) comprising:
one or more memory devices configured to store instructions that, when executed on one or more processors, cause the one or more processors to:
generate, on a remote computing system, a first predictive model using one or more machine learning techniques, wherein the first predictive model is generated using a first operating data set in response to determining a size of the first operating data set exceeds a threshold, the first operating data set collected at a first time interval based on one or more operating parameters associated with at least one of a plurality of BMS subsystems;
store the first predictive model at the first time interval in the remote computing system in an unbuilt state;
receive a prediction request from a user input at a second time interval following the first time interval;
retrieve the first predictive model in the unbuilt state from the remote computing system;
rebuild, locally, the first predictive model;
execute the rebuilt predictive model to generate a first prediction in response to the prediction request;
initiate an automated response based on the first prediction, wherein initiating the automated response comprises performing an automated control action comprising at least one of (i) controlling equipment to enter a safety mode, (ii) operating the equipment at a derated state, (iii) shutting down the equipment, (iv) controlling the equipment using an adjusted setpoint, (v) controlling the equipment to work-around a fault, or (vi) controlling the equipment to prevent the fault from occurring; and
automatically train, at an end of an update period beginning when the first predictive model is generated, the first predictive model using the first operating data set and a second operating data set collected at a fourth time interval, wherein the fourth interval time is after the first interval time, wherein the update period is based on the size of the first operating data set.

2. The BMS of claim 1, where in the BMS subsystems are virtual subsystems and the first operating data set is a virtual operating data set.

3. The BMS of claim 1, wherein the instructions cause the one or more processors to:
in response to the prediction request, receive a current data set; and
generate the first prediction using the first predictive model based on the prediction request and the current data set.

4. The BMS of claim 1, the instructions further comprising:
determining a diagnosis associated with the first prediction to facilitate taking preventative measures; and
performing the automated control action based on the diagnosis to prevent a predicted fault from occurring.

5. The BMS of claim 1, wherein the first prediction is a fault prediction for at least one of a plurality of the BMS subsystems.

6. The BMS of claim 1, wherein generating the first predictive model comprises:
transmitting the first operating data set based on the one or more operating parameters associated with at least one of a plurality of BMS subsystems to the remote computing system; and
receiving the first predictive model from the remote computing system.

7. The BMS of claim 1, wherein storing the first predictive model at a first time interval comprises:
transmitting the first predictive model to the remote computing system.

8. The BMS of claim 1, wherein retrieving the first predictive model comprises:
receiving the first predictive model from the remote computing system.

9. The BMS of claim 1, wherein initiating an automated response based on the first prediction comprises:
transmitting a notification to a user indicating the first prediction.

10. The BMS of claim 9, wherein the notification to the user comprises:
generating and displaying a GUI based on the first prediction.

11. The BMS of claim 1, wherein the first predictive model is associated with at least one of a plurality of types of building equipment, and wherein the update period is further based on the at least one of the plurality of types of building equipment.

12. A method of controlling building equipment, comprising:
generating, on a remote computing system, a first predictive model using one or more machine learning techniques, wherein the first predictive model is generated using a first operating data set in response to determining a size of the first operating data set exceeds a threshold, the first operating data set collected at a first time interval based on one or more operating parameters associated with the building equipment;
storing the first predictive model at the first time interval in the remote computing system;
receiving a prediction request from a user input at a second time interval following the first time interval;
retrieving the first predictive model from the remote computing system;
rebuilding, in a local computing system, the first predictive model;
executing the rebuilt predictive model to generate a first prediction in response to the prediction request;
initiating an automated response based on the first prediction, wherein initiating the automated response comprises performing an automated control action comprising at least one of (i) controlling equipment to enter a safety mode, (ii) operating the equipment at a derated state, (iii) shutting down the equipment, (iv) controlling the equipment using an adjusted setpoint, (v) controlling the equipment to work-around a fault, or (vi) controlling the equipment to prevent the fault from occurring; and
automatically training, at an end of an update period beginning when the first predictive model is generated, the first predictive model using the first operating data set and a second operating data set collected at a fourth time interval, wherein the fourth interval time is after the first interval time, wherein the update period is based on the size of the first operating data set.

13. The method of claim 12, further comprising:
in response to the prediction request, receiving a current data set; and
generating the first prediction using the first predictive model based on the prediction request and the current data set.

14. The method of claim 12 further comprising:
determining a diagnosis associated with the first prediction to facilitate taking preventative measures; and
performing the automated control action based on the diagnosis to prevent a predicted fault from occurring.

15. The method of claim 12, wherein the first predictive model is associated with at least one of a plurality of types of building equipment, and wherein the update period is further based on the at least one of the plurality of types of building equipment.

16. A building management system (BMS) configured to:
generate, on a remote computing system, a first predictive model using one or more machine learning techniques, wherein the first predictive model is generated using a first operating data set in response to determining a size of the first operating data set exceeds a threshold, the first operating data set collected at a first time interval based on one or more operating parameters associated with HVAC equipment;
store the first predictive model at the first time interval in the remote computing system;
receive a prediction request from a user input at a second time interval following the first time interval;
retrieve the first predictive model from the remote computing system;
rebuild, locally, the first predictive model;
execute the rebuilt predictive model to generate a first prediction in response to the prediction request;
initiate an automated control response based on the first prediction, wherein initiating the automated response comprises performing an automated control action comprising at least one of (i) controlling equipment to enter a safety mode, (ii) operating the equipment at a derated state, (iii) shutting down the equipment, (iv) controlling the equipment using an adjusted setpoint, (v) controlling the equipment to work-around a fault, or (vi) controlling the equipment to prevent the fault from occurring; and
automatically train, at an end of an update period beginning when the first predictive model is generated, the first predictive model using the first operating data set and a second operating data set collected at a fourth time interval, wherein the fourth interval time is after the first interval time, wherein the update period is based on the size of the first operating data set.

\* \* \* \* \*